(12) United States Patent
Lynch et al.

(10) Patent No.: US 6,693,409 B2
(45) Date of Patent: Feb. 17, 2004

(54) CONTROL SYSTEM FOR A POWER CONVERTER AND METHOD OF CONTROLLING OPERATION OF A POWER CONVERTER

(75) Inventors: Jonathan A. Lynch, St. Johnsbury, VT (US); Jeffrey K. Petter, Williston, VT (US)

(73) Assignee: Northern Power Systems, Inc., Waitsfield, VT (US)

( * ) Notice: Subject to any disclaimer, the term of this patent is extended or adjusted under 35 U.S.C. 154(b) by 0 days.

(21) Appl. No.: 10/200,916

(22) Filed: Jul. 23, 2002

(65) Prior Publication Data

US 2003/0035308 A1 Feb. 20, 2003

Related U.S. Application Data

(60) Provisional application No. 60/307,658, filed on Jul. 23, 2001.

(51) Int. Cl.[7] .................................................. G05F 1/70
(52) U.S. Cl. ......................... 323/208; 323/207; 307/11; 307/82; 307/64
(58) Field of Search ................................. 323/207, 208; 307/11, 18, 31, 64, 75, 82

(56) References Cited

U.S. PATENT DOCUMENTS

| | | | |
|---|---|---|---|
| 2,821,639 A | 1/1958 | Bright et al. ............... 307/88.5 |
| 5,041,957 A | 8/1991 | Dhyanchand et al. ......... 363/43 |
| 5,047,909 A | 9/1991 | Hosoda ........................ 363/40 |
| 5,070,440 A | 12/1991 | Walker ......................... 363/71 |
| 5,091,840 A | 2/1992 | Walker ......................... 363/96 |
| 5,191,519 A | 3/1993 | Kawakami .................... 363/71 |
| 5,289,046 A | * | 2/1994 | Gregorich et al. ............. 307/66 |
| 5,631,503 A | * | 5/1997 | Cioffi ........................... 307/66 |
| 5,745,356 A | 4/1998 | Tassitino, Jr. et al. ......... 363/71 |
| 6,118,680 A | 9/2000 | Wallace et al. ................ 363/71 |
| 6,356,471 B1 | 3/2002 | Fang ............................ 363/65 |
| 6,459,601 B1 | 10/2002 | Oba ............................ 363/131 |

* cited by examiner

Primary Examiner—Shawn Riley
(74) Attorney, Agent, or Firm—Downs Rachlin Martin PLLC

(57) ABSTRACT

A control system (20) for a power converter (22) designed to convert DC power from a source (30) such as a battery, flywheel or fuel cell into AC power. The control system includes an impedance current regulator (106) for providing an impedance current signal to a summing unit (110) where it may be combined with real and reactive current command signals provided from respective sources (62, 64). The resultant current signal provided by the summing unit is provided to a voltage correction unit (112) that uses the resultant current signal in developing a correction voltage signal provided to the power converter. The correction voltage signal contains information used by the power converter in adjusting the real and reactive currents in its output AC power based on the ability of the AC power network to accept changes in current. Multiple power converters having the control system of the present invention may be connected in parallel to a single AC load or multiple AC loads, without the need for a separate control system interconnecting the power converters. The control system may be advantageously incorporated into a distributed generation network and in uninterruptible power systems, whether or not such systems are included in a distributed generation network.

51 Claims, 21 Drawing Sheets

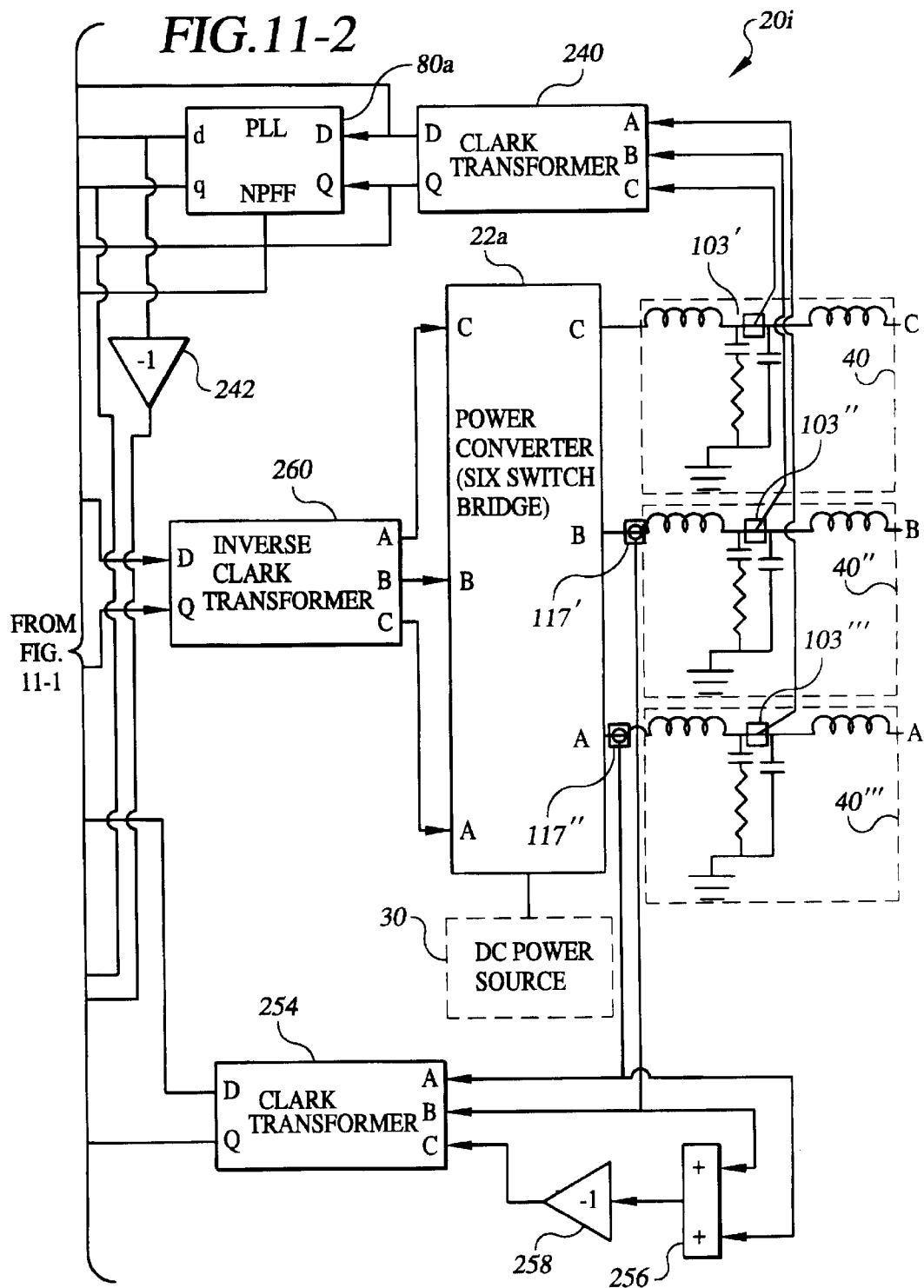

CONTROL SYSTEM FOR A POWER CONVERTER AND METHOD OF CONTROLLING OPERATION OF A POWER CONVERTER

PRIOR APPLICATION INFORMATION

This application claims the benefit of provisional application Ser. No. 60/307,568, filed Jul. 23, 2001.

BACKGROUND OF THE INVENTION

There are many types of new distributed generation (DG) and energy storage products being developed throughout the world. These include: fuel cells, flywheels, advanced batteries, micro-turbines, Stirling engines, wind turbines, solar cells and double layer capacitors. Each one of these devices requires a power electronic inverter at its output to make useful AC power. Typically, this is 50 or 60 Hz single or three-phase power.

A number of techniques have been described in patents and literature for connecting these devices to each other and to a utility grid. All of these are techniques involve the use of parallel power converters. These converters fall into two categories, devices paralleled on the DC side of the converter or devices paralleled on the AC side of the converter.

The concept of paralleling devices on the DC side permits the use of one large inverter, thereby reducing inverter costs. This motivation for paralleling devices on the DC side is less significant today than in the past, since the cost of controls for multiple inverter systems has decreased significantly. For a larger system, the DC side technique uses a DC distribution system with each distributed generator supplying DC power to the DC distribution system and each load having its own inverter. In this system, a single inverter failure will cause loss of load.

Paralleling devices on the AC side is inherently more reliable, since the loads are AC. No single device failure need drop the AC power to loads as long as there is some excess capacity.

The typical method used to connect a number of power electronics units in parallel is to make one master and the rest slaves. The master is a voltage source and the slaves are current sources. This method works well if the loads are linear, have no quick surges, and draw only real power. When all of these characteristics are not present, problems can arise. These problems can be overcome to some extent through the use of high bandwidth control systems between the paralleled inverters. However, these control systems are not generally applicable for large or disperse systems. In addition, the high speed communication needed between inverters in parallel causes a single point failure issue for parallel redundant power systems and thus makes the master/slave method less reliable.

Equipment has been developed for load sharing between parallel inverters in AC power systems without the use of control circuitry connected to the inverters. Examples of such systems are described in U.S. Pat. No. 5,745,356 to Tassitino, Jr. et al. and U.S. Pat. No. 6,118,680 to Wallace et al. The information needed for load sharing is obtained from the output of each inverter in these systems. The output of each inverter is adjusted based on this information so that all of the inverters in the system equally share the load. Unfortunately, these systems are not believed to share current harmonics and transients, nor do these apparently share reactive current.

SUMMARY OF THE INVENTION

One aspect of the present invention is a control system for a controlled current source that receives DC power as an energy input and provides an AC power output for delivery to an AC power network, the AC power output having an output voltage. The control system comprises a voltage signal device, connectable to the controlled current source, for providing a voltage feedback signal representing voltage in the AC power output as an input to control the controlled current source. The control system additional comprises an impedance current regulator for generating an impedance current signal as a function of characteristics of the AC power output from the controlled current source.

Another aspect of the present invention is a system for providing AC power to an AC power network, the system intended for use with a first source that provides a reference AC voltage signal, a second source that provides a real current command signal and a third source that provides a reactive current command signal. The system includes a controlled current source having a source of DC power and a converter for converting the DC power to AC power having an output voltage. The system also includes a current command unit for generating a resultant current command signal. The current command unit is connected to the controlled current source and is connectable to the first and second sources. The current command unit includes an impedance current regulator that provides an impedance current signal and a summing unit for adding the impedance current to the real current command signal from the second source and the reactive current command signal from the third source so as to create the resultant current command signal.

Yet another aspect of the present invention is a method of controlling the operation of a power converter connected to an AC power network that provides an AC power output. The method includes as one step providing a reference AC voltage signal representing output voltage from the power converter. Then, an impedance current command signal is generated, wherein the impedance current command signal is generated based on the reference AC voltage signal. Next, a voltage command signal is generated for controlling the operation of the power converter based on the impedance current command signal and the voltage command signal is provided to the power converter.

Still another aspect of the present invention is a distributed generation network. The network comprises an AC power network for providing AC power and a DC power source for providing DC power. In addition, the network includes a power converter for converting the DC power into AC power. The power converter is connected to the AC power network and the DC power source. The network further includes a control system connected to the power converter for providing a voltage command signal that controls the operation of the power converter. The control system generates (i) a voltage feedback signal representing voltage in said AC power provided by said DC power source and (ii) an impedance current signal as a function of AC power provided by said DC power source. In addition, the control system generates the voltage command signal based on the voltage feedback signal and the impedance current signal.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein:

FIGS. 5-1 and 5-2 together contain a schematic diagram of a control system similar to the one shown in FIG. 1, except that it includes a modification to the impedance current regulator;

FIGS. 10-1, 10-2 and 10-3 together contain a schematic diagram of a 3-phase, 4-wire, version of the power converter illustrated in FIG. 1;

FIGS. 11-1, 11-2 and 11-3 together contain a schematic diagram of a control system similar to the one shown in FIGS. 10-1, 10-2 and 10-3, except that it is intended for use with a 3-phase, 3-wire, power converter;

DETAILED DESCRIPTION OF THE INVENTION

Figure 1:
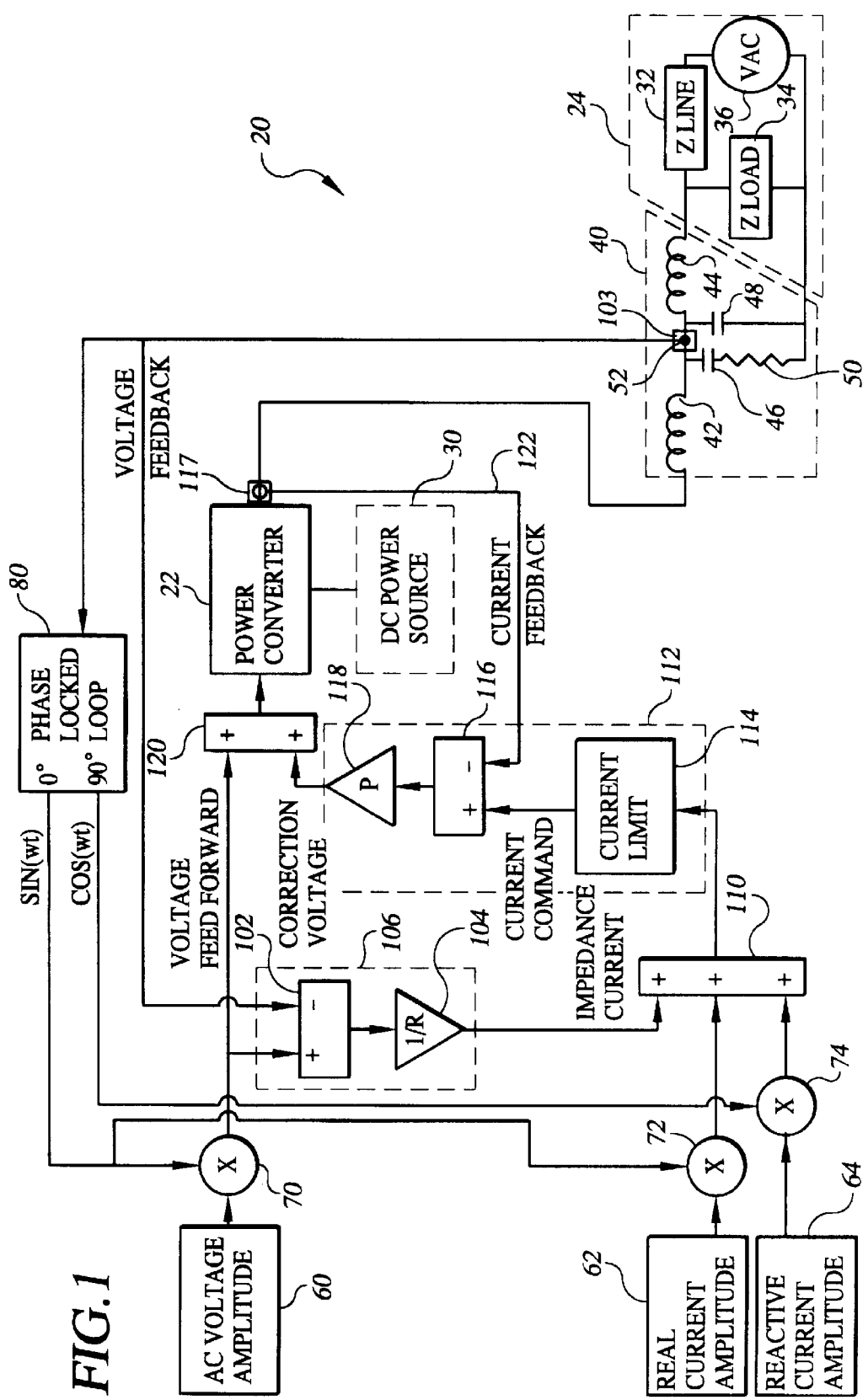
FIG. 1 is a schematic circuit diagram of the power converter control system of the present invention.

Referring to FIG. 1, the present invention is a system 20 designed for connecting a power converter 22 to an AC power network 24, and for controlling the power converter. The invention makes it possible to connect any number of power converter's 22 in parallel to the same AC power network 24 without the need for a separate control system connected to the multiple power converters 22. AC power network 24 can be a conventional utility grid or an isolated power network. System 20 works for both single and three-phase systems.

System 20 is connected between a DC power source 30, such as a battery, flywheel, photovoltaic panel, or fuel cell, and AC power network 24. In particular, DC power source 30 is connected so that the power it generates is provided to power converter 22.

Power converter 22 may comprise any conventional converter for converting DC power to AC power, e.g., converters of the type described in U.S. Pat. Nos. 2,821,639 and 5,191,519, which are incorporated herein by reference. Power converter 22 can be thought of as an ideal unity gain amplifier. Indeed, any device that can follow a waveform is encompassed by the present invention as power converter 22.

In one embodiment, power converter 22 may be a switching power converter half bridge (not shown) with a pulse width modulation (PWM) control (not shown) and compensation (not shown) to linearize the output. The compensation is typically dead-time compensation and DC input voltage feed forward if needed. Dead-time compensation is a small fixed offset to each PWM input signal. The offset is either positive or negative depending on the polarity of the output current. The amplitude of the offset is proportional to the ratio of the switch dead time to the switching period. Dead-time compensation is provided to account for momentary loss of voltage control during switching. DC voltage compensation is performed by dividing the signal going to the PWM, before it goes to the dead time compensation, by the value of the actual DC voltage divided by the nominal DC voltage. This makes the gain of the power converter independent of the DC voltage. This may not be needed if the DC input is well controlled.

In other embodiments, power converter 22 may be an inverter. Suitable inverters include all types of PWM or resonant inverters, single phase and multi-phase; indeed any power inverter for making AC power, which can follow a reference waveform like an amplifier or a motor drive.

AC power network 24 is represented schematically by line impedance 32, load impedance 34 and the effective EMF 36 of the AC power network. Load impedance 34 is the impedance associated with the load supplied by system 20 and line impedance 32 is the impedance otherwise present on AC power network 24. Load impedance 34 can be very dynamic and is often non-linear and reactive. Line impedance 32 is less dynamic and is typically very inductive. Effective EMF 36 is typically a sine wave with a fundamental frequency of 50 or 60 Hz within +/-10% of the expected voltage and can have up to a few percent harmonic distortion, typically at odd harmonics of the fundamental frequency. AC power network 24 is the environment with which system 20 is used and is part of the present invention only in its broadest definition. AC power network 24 may be a utility grid or an isolated power network.

System 20 may include a filter 40 connected between the output of power converter 22 and AC power network 24. In one embodiment, filter 40 is a damped LCL tee filter including inductors 42 and 44 connected in series with one another and between power converter 22 and line impedance 32. Filter 40 also includes capacitors 46 and 48 connected in parallel with one another and in parallel with load impedance 34, and resistor 50 connected in series with capacitor 46. Capacitors 46 and 48 are connected at the tee point 52 of filter 40 between inductors 42 and 44.

This embodiment of filter 40 provides ripple filtering from power converter 22 and provides impedance for controlling the power converter current. This embodiment of filter 40 also provides some high frequency isolation for other elements of system 20 so that the loads on AC power network 24 do not have a large effect on the stability of the system. In this embodiment, the inductors are about 5% impedance (5% of the rated voltage divide by the rated current at 60 Hz) and the corner frequency of filter 40 is about 3 kHz and the Q is about 4. In some cases, it may be desirable to omit filter 40 from system 20, and the present invention encompasses other filters known to those skilled in the art. In any event, attributes of the AC power at tee point 52 is influenced by line impedance 32, load impedance 34 and effective EMF 36 by virtue of the placement of filter 40 between the output of power converter 22 and AC power network 24.

System 20 also includes a source 60 for a reference AC voltage command signal, a source for a real current command signal 62 and a source for a reactive current command signal 64. The reference AC voltage command signal provided by source 60 is a voltage amplitude. The real current command signal from source 62 is a current amplitude and the reactive current command signal from source 64 is also a current amplitude. Unit sine and cosine waveforms are multiplied by the voltage and current amplitude signals from sources 60, 62 and 64, as described below. The output from these sources is provided, respectively, at multipliers 70, 72 and 74. A phase locked loop (PLL) 80 is preferably included in system 20. PLL 80 generates a direct (sine) and quadrature (cosine) wave exactly in phase with the voltage at the tee point 52 of filter 40, which is provided as an input to the PLL via line 82. These two waveforms are preferably very pure sine waves that are exactly phase locked to the incoming signals. Any one of a variety of phase locked loops known to those skilled in the art may be used as PLL 80.

Figure 2:
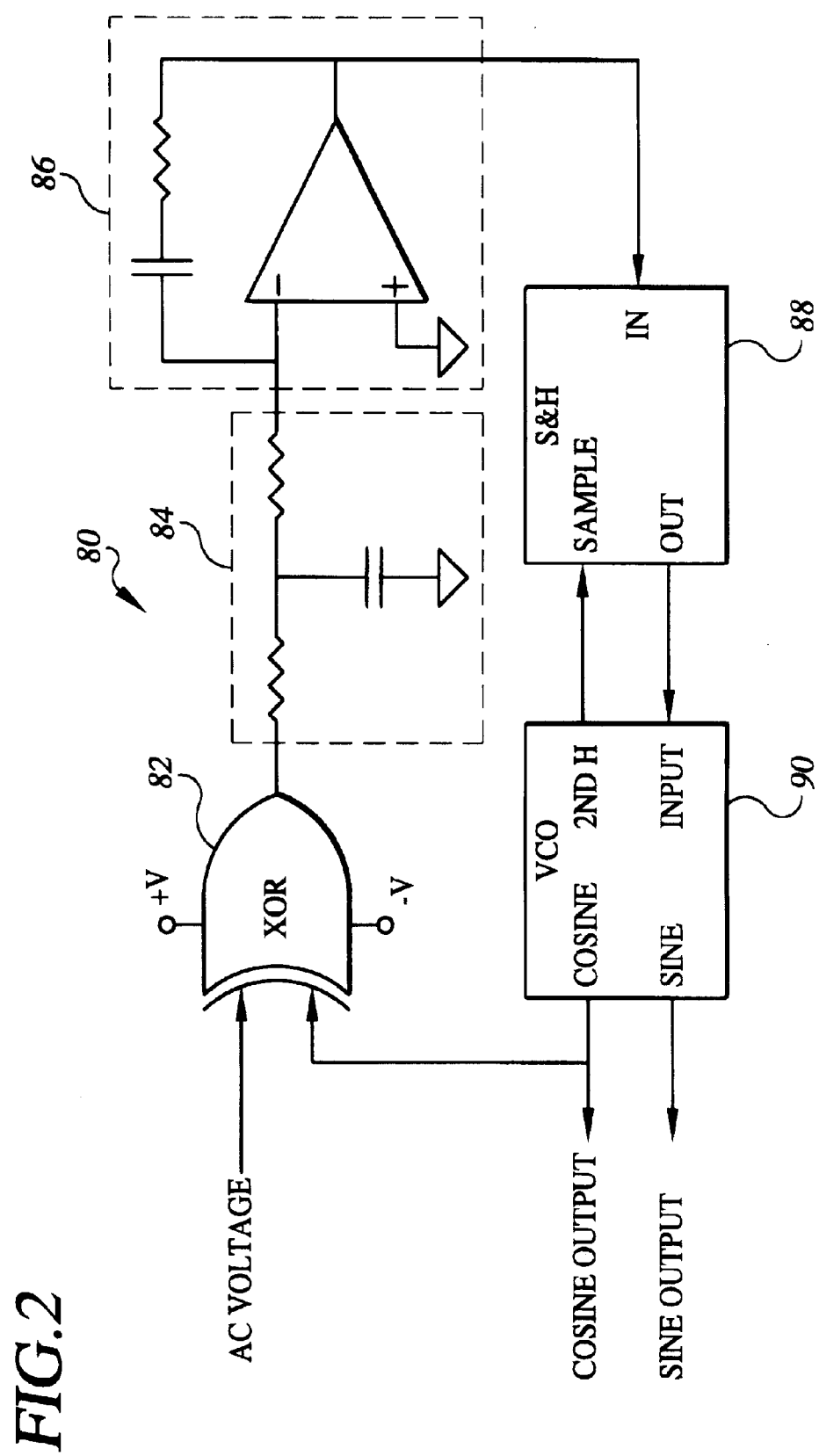
FIG. 2 is a schematic circuit diagram of a phase locked loop that may be used in the system of FIG. 1.

One phase locked loop that may be used as PLL 80 is illustrated in FIG. 2. The phase detector in this PLL is XOR gate 82. This implementation of PLL 80 also includes a loop filter 84, e.g., a 10 Hz single low-pass filter, though which the output of XOR gate 82 is filtered. The output of filter 84 is provided to an integrator 86 with a zero at 0.1 Hz. PLL 80 also has a sample and hold circuit 88 that receives as its input the output of integrator 86. PLL 80 further includes a voltage-controlled oscillator (VCO) 90 connected to receive the output of sample and hold circuit 88. VCO 90 generates as outputs two waveforms, a cosine waveform and a sine waveform. VCO 90 further generates a second harmonic of its frequency, which is provided as a sample input to sample and hold circuit 88. The latter samples the output of integrator 86 as a function of the second harmonic input.

The cosine wave from VCO 90 is fed to XOR circuit 82 for comparison with the input voltage waveform taken at tee point 52. In addition, the cosine waveform is provided to multiplier 70, where it is multiplied by the reference voltage amplitude signal provided by source 60. The sine waveform from PLL 80 is fed to multiplier 72, where it is multiplied by the real current amplitude signal provided by source 62, and to multiplier 74, where it is multiplied by the reactive current amplitude signal provided by source 64.

The gain of VCO loop gain 90 is chosen so that the open loop gain bandwidth product at about 1 Hz is 1. This makes a second order PLL with a closed loop bandwidth of 1 Hz and a tracking second harmonic notch filter for very pure output waveform. The second order feature is used to force the phase error to zero at all frequencies. A second order PLL is not required for system 20; it simply is a good way to achieve a very low phase error.

System 20 also includes a difference unit 102 connected to receive as inputs a voltage signal representing the voltage at tee point 52 and the reference voltage signal provided by voltage source 60. A voltage signal device 103, that includes known elements not shown such as A/D converters, scaling devices and other equipment, receives the actual output voltage from power converter 22 and then develops the voltage feedback signal provided to difference unit 102 based on the actual output voltage. Difference unit 102 determines the voltage difference between the reference AC voltage signal and the voltage feedback signal and provides this difference to gain 104 as a voltage difference signal. Together, difference unit 102 and gain 104 make up an impedance current regulator 106.

Gain 104 provides a 1/R gain, where R is an effective real output resistance. R is determined by dividing the rated output voltage of power converter 22 by the rated output current of the power converter and multiplying the result by 0.02 to 0.2, depending upon desired performance, attributes of AC power network 24 and other factors known to those skilled in the art. For good performance in a typical AC power network 24, R is typically about 0.05 times the rated output voltage divided by the rated output current. The output of gain 104 is an impedance current signal.

System 20 further includes a summing unit 110. The latter is connected to receive as its inputs the impedance current signal from gain 104, the real current signal from source 62 and the reactive current signal from source 64. Summing unit 110 sums these three current signals to develop a resultant current signal. In some instances, it may be useful to consider summing unit 110 as part of impedance current regulator 106, although it is not so indicated in the drawings.

A correction voltage unit 112 is included in system 20. Unit 112 includes a current limit 114 for receiving the resultant current signal from summing unit 110 and then limiting the current it provides as an output so as to protect power converter 22 from an over-current condition. Correction voltage unit 112 also includes a difference unit 116, which receives as one input the limited current signal from current limit 114. The other current input signal to difference unit 116 is an output current signal representing the output current from power converter 22, before filter 40. This signal is developed by current signal device 117 that includes known elements such as A/D converters, scaling devices and other equipment not shown in the drawings. Difference unit 116 determines the difference between these current signals and then provides a current difference signal to gain 118. The output from gain 118 is a correction voltage signal provided to voltage summing unit 120. The correction voltage and the feed forward voltage signal provided from multiplier 70 is combined at summing unit 120 and provided as a control voltage input signal, also referred to herein as a voltage command signal, to power converter 22. Although voltage correction unit 112 is shown in FIG. 1 as not including summing unit 120, it is useful in some cases to consider the summing unit as part of the voltage correction unit.

Gain 118 is used to control the bandwidth of the current control loop made up of difference unit 116, gain 118, summing unit 120, power converter 22 and the line 122 connecting providing the current feedback signal from device 117 to difference unit 116. Suitable performance of system 20 is obtained when this bandwidth is set between 1 and 2 kHz, although other frequencies may be desirable for certain applications, as those skilled in the art will appreciate. The specific gain P provided by gain 118 depends on the desired bandwidth B, the inductance of filter 40, and the voltage gain G of power converter 22 including scaling factors in the voltage sensing circuits (not shown) responsible for generating the voltage feedback from tee point 52. Gain G typically has a value near 1. In other words this gain G is simply the signal level gain from the input of the power converter 22 back to tee point 52. Thus, the gain parameter P is $2*\pi*B*L*/G$, where B is the desired bandwidth and L is the inductance of filter 40.

Figure 3:
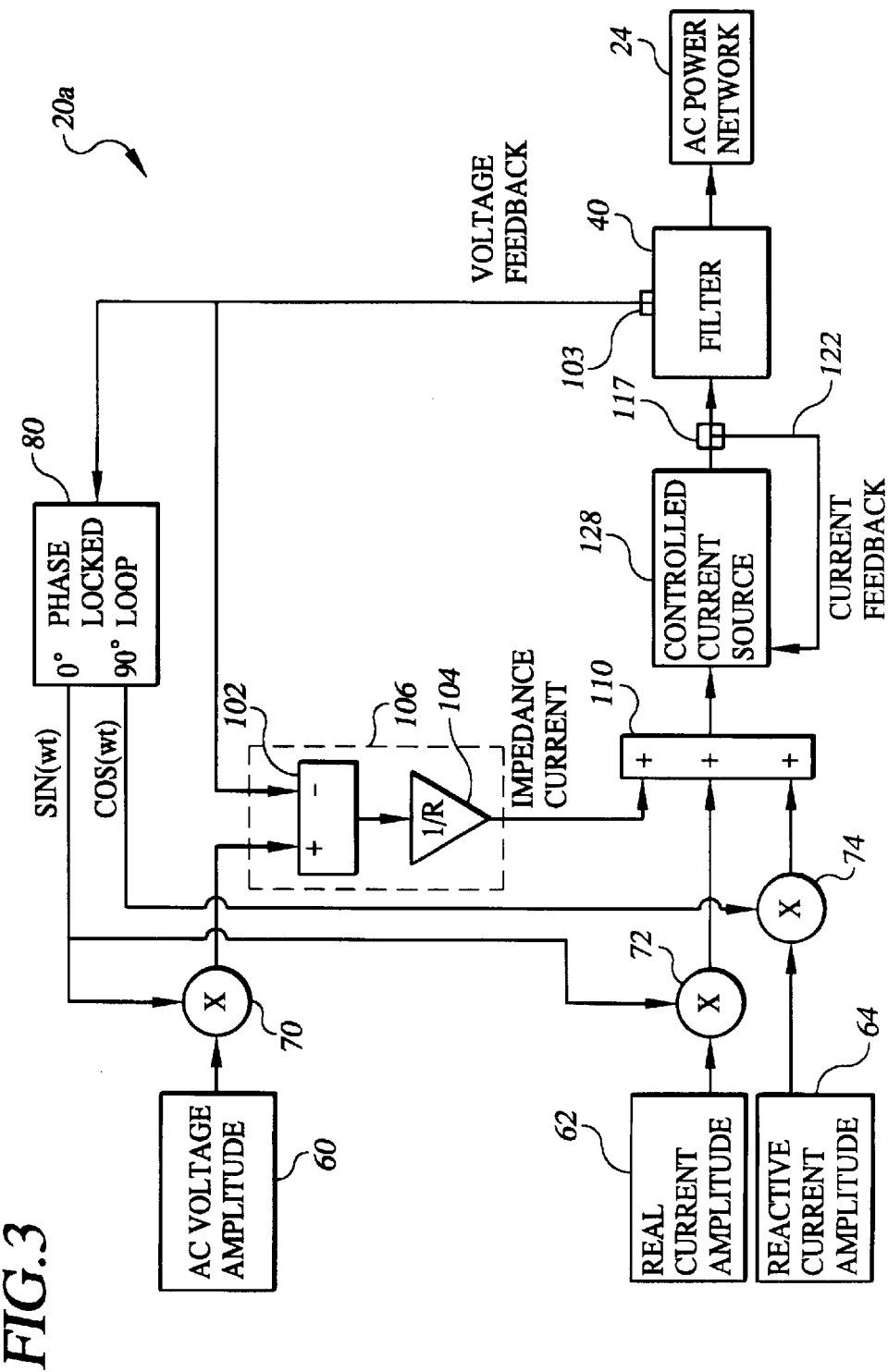
FIG. 3 is a schematic diagram illustrating a more generalized version of the control system illustrated in FIG. 1.

A simplified version of system 20, illustrated in FIG. 3 and identified as system 20a, emphasizes the important impedance current regulation aspect of the present invention. System 20a is similar to system 20, with like elements having like numbers. System 20a includes a controlled current source 128 for providing controlled AC power. Current source 128 takes the place of, and performs the same functions as, power converter 22, DC power source 30, correction voltage unit 112 and summing unit 120. It is to be appreciated, however, that controlled current source 128 is intended to represent a generalized controlled current source, and so encompasses a variety of implementations and is not limited to just a mere combination of elements in system 20.

The resultant current signal from summing unit 110 is provided to controlled current source 128. There, after determining a difference relative to a current feedback signal representing the current output of the power converter 22, and applying gain P to the current difference, a correction voltage signal is generated. As discussed above, this correction voltage signal is combined with the reference AC voltage signal to create a voltage control signal for power converter 22 in controlled current source 128. The output from controlled current source 128 is provided through filter 40 to AC power network 24.

The various elements making up system 20, with the exception of power converter 22, are typically implemented in software or firmware within a controller connected to the power converter and AC power network 24. Thus, in a typical implementation of system 20 discrete circuit elements or devices are not used. The present invention, however, encompasses implementation of the invention in just software or firmware (with associated equipment to provide the necessary current and voltage feedback signals from the output of power converter 22) and also as discrete circuit elements and devices.

Discussing now the operation of the present invention, with reference to system 20 (FIG. 1) and system 20a (FIG. 3), AC energy is provided from controlled current source 128 through filter 40 to AC power network 24. Impedance current regulator 106 influences the real and reactive current provided by controlled current source 128 based on the ability of AC power network 24 to absorb current changes from controlled current source 128. In this regard, the impedance current signal provided by regulator 106 is combined with real and reactive current signals from sources 62 and 64, respectively, so as to ultimately modify the real and reactive currents in the AC power provided by controlled current source 128.

The impedance current signal provided by impedance current regulator 106 is influenced by (i) line impedance 32, load impedance 34 and effective EMF 36 in AC power network 24, and by (ii) characteristics of the output power from controlled current source 128. This influence on the impedance current signal occurs by virtue of the voltage feedback signal from tee point 52 in filter 40 being provided to difference unit 102 in current regulator 106 and by virtue of the current feedback signal from the output power of power converter 22, before, filter 40 being provided to difference unit 116. As concerns the voltage feedback signal, the impedance current signal provided to summing unit 110 is based on the difference between the feedback voltage signal from tee point 52 and a reference voltage signal from source 60 (with its sine wave controlled via the output of PLL 80), as developed within current regulator 106. Thus, the voltage signal input to gain 104, which ultimately influences the output of controlled current source 128, is based on the prevailing voltage on AC power network 24 and a reference voltage amplitude (from source 60), the sine waveform of which has been controlled by PLL 80 relative to the sine waveform of the AC power at tee point 52. As concerns the current feedback signal on line 122, the difference between such signal and the resultant current command signal from summing unit 110, as determined at difference unit 116, ensures that the voltage control signal provided to the power converter is influenced in part by the current in the AC output power from power converter 22.

The amount of impedance current correction is controlled by the value of the gain in gain unit 104 (1/R). This gain is represented by 1/R because the value of R represents an effective output resistance of power converter 22. In other words this gain controls the number of amps that power converter 22 provides for each volt of difference between the reference voltage from source 60 and the voltage feedback signal from tee point 52.

Gain P provided by gain 118 is selected, in part, as a function of the desired bandwidth of the current control loop, as noted above. A bandwidth in the range of 1 to 2 kHz is typical, although the invention is not so limited. The capability of system 20 will be limited by the DC power source 30 behind it. In many cases, DC power source 30 will only be able to provide positive power and the level of power will only change slowly. In other cases, the DC power source 30 will only have a limited amount of energy storage. The power level of this energy storage can change quickly but must be recharged after use. While performing its function of supplying power to or from AC power network 24, system 20 is simply a bi-directional DC to AC power converter that takes into account the AC system needs.

The resultant current signal provided by summing unit 110 to controlled current source 128 is created as a function of the amplitude of the real current signal from source 62 and the sine waveform imposed by PLL 80. This real current signal is used to control the real power flow from a specific DC power source relative to other equipment connected to AC power network 24. The real current signal may be either positive or negative. Negative values are used to recharge sources with energy storage capability.

The reactive current signal provided by summing unit 110 to controlled current source 128 is created as a function of the amplitude of the reactive current signal from source 64 and the cosine waveform imposed by PLL 80. This reactive current signal is used to control the reactive power flow relative to other equipment connected to AC power network 24. The reactive current command signal can be used to control the power factor of the output current from power converter 22 to compensate for a load or provide reactive power to an AC power network 24. The cosine waveform of the reactive current signal is 90 degrees out of phase with the sine waveform generated from real current command source 62, and may be either positive or negative.

The three input parameters to system 20 from sources 60, 62 or 64 can be controlled within system 20 or based on external commands. It should be noted that the control provided by system 20 does not permit power converter 22 to track exactly the command signals from these three sources. It cannot because it must also respond to the local voltage and impedance of AC power network 24. This characteristic of system 20 occurs due to the use of impedance current from impedance current regulator 106, as discussed above. System 20 uses the output voltage signal from tee point 52 to modify the current command, and in particular the impedance current signal, so that the output voltage does not get too far out of range. Since the impedance regulation is performed in a high-speed real-time routine, in the case of a fault the voltage recovers quickly without much overshoot to the normal value once the fault is cleared. Similarly, voltage surges are supported and other equipment is not disturbed.

Figure 4:
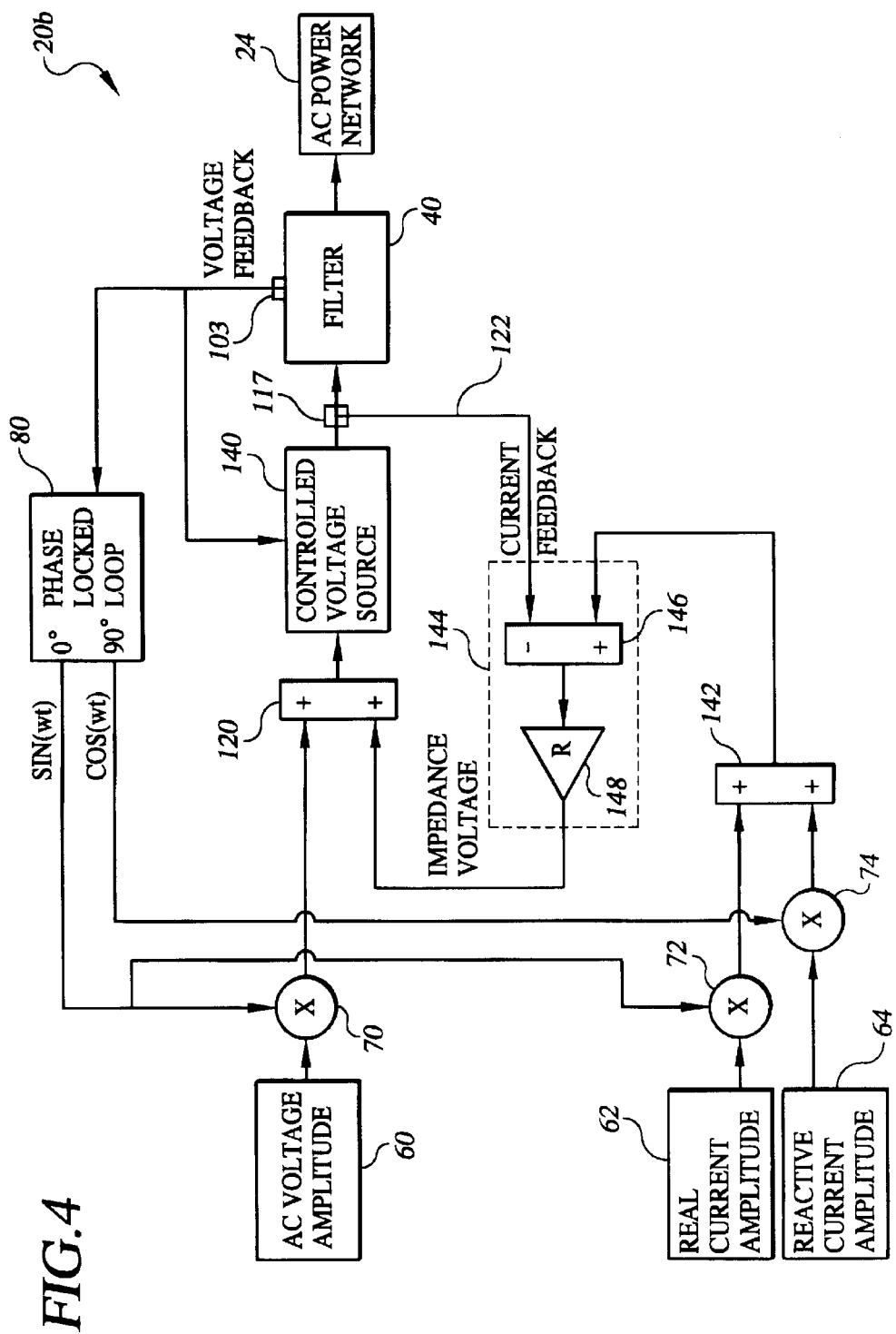
FIG. 4 is a schematic diagram of a control system similar to the one shown in FIG. 3, except that the voltage feedback loop is positioned within the current feedback loop.

Referring to FIGS. 3 and 4, in system 20 and 20a the current control loop is positioned inside the voltage control loop with a specific gain 1/R. The present invention includes as another embodiment turning the control loops inside out, as illustrated relative to system 20b in FIG. 4. Where system 20b is identical to system 20a, common elements are identically numbered. An important difference, however, is that controlled voltage source 140 is used in place of controlled current source 128. Controlled voltage source 140 is similar to controlled current source 128, except that the input control signal is a voltage signal instead of a current signal.

Another difference between systems 20a and 20b is that impedance current regulator 106 is not included, nor is summing unit 110. Real and reactive current command signals from sources 62 and 64, respectively, are combined in summing unit 142 and are provided as a summed current signal to impedance current regulator 144. The latter includes a difference unit 146 for generating a difference signal representing the difference between the summed current signal from summing unit 142 and a current feedback signal from device 117 representing the output current of the AC power output of the power converter 22 (not shown) in controlled voltage source 140. This feedback current can be considered the impedance current used in controlling controlled voltage source 140. Impedance current regulator 144 also includes a gain unit 148 that applies a gain R to the difference signal from difference unit 146. A gain R, rather than a gain 1/R, is used in gain 148 because the input to gain 148 is a current rather than a voltage. The value of R is discussed above in connection with the discussion of system 20. Although not shown, a current limit similar to current limit 112 is preferably included in system 20b for limiting the summed current from summing unit 142.

In operation, the control method provided by system 20b is reasonably equivalent to that of system 20a, as discussed above. The only notable differences are (1) there is no simple place to add a current limiting function; and (2) with the voltage loop on the inside of the current loop, the voltage transient response will be faster than the current response.

Figures 1, 5:
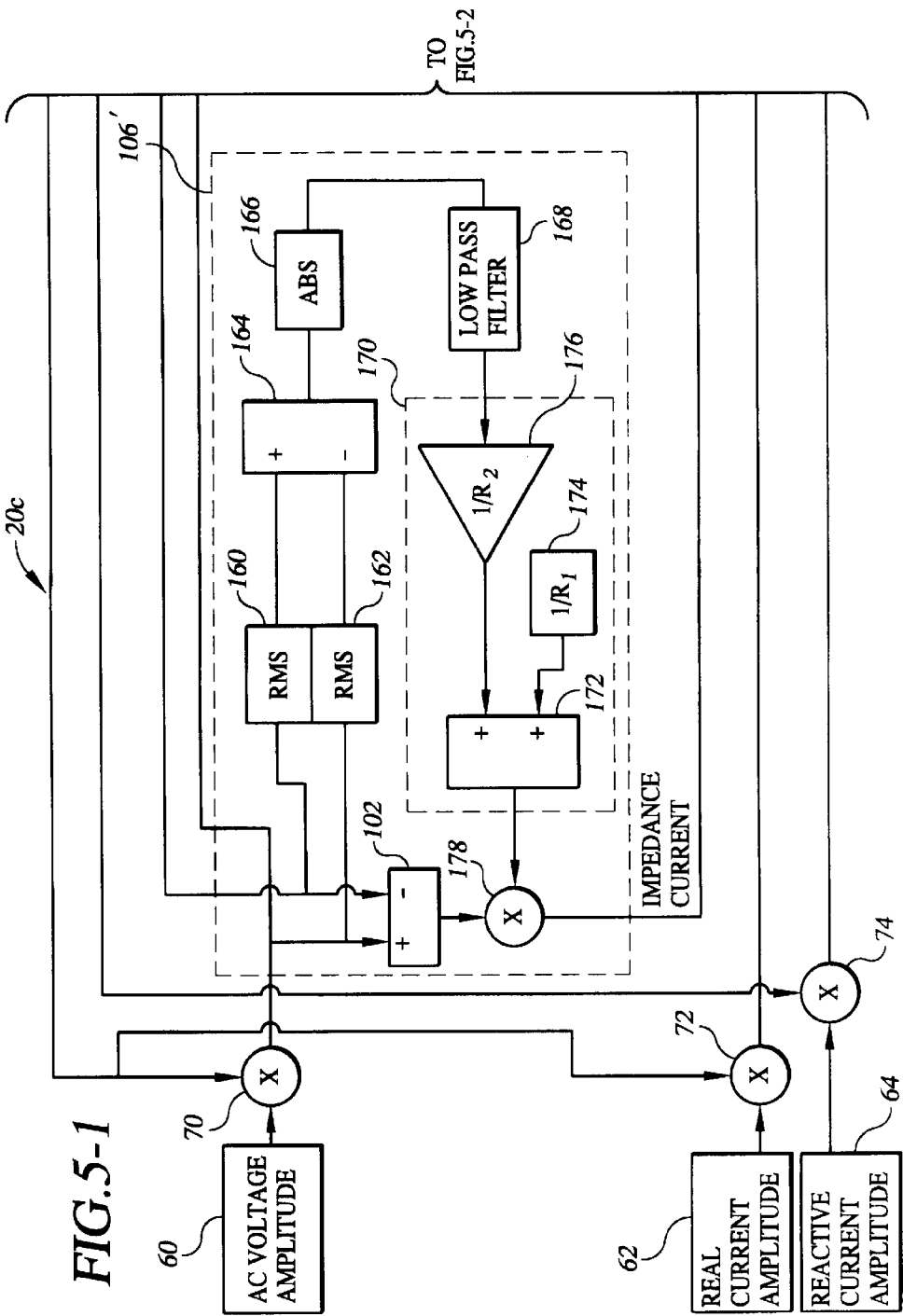
Figures 2, 5:
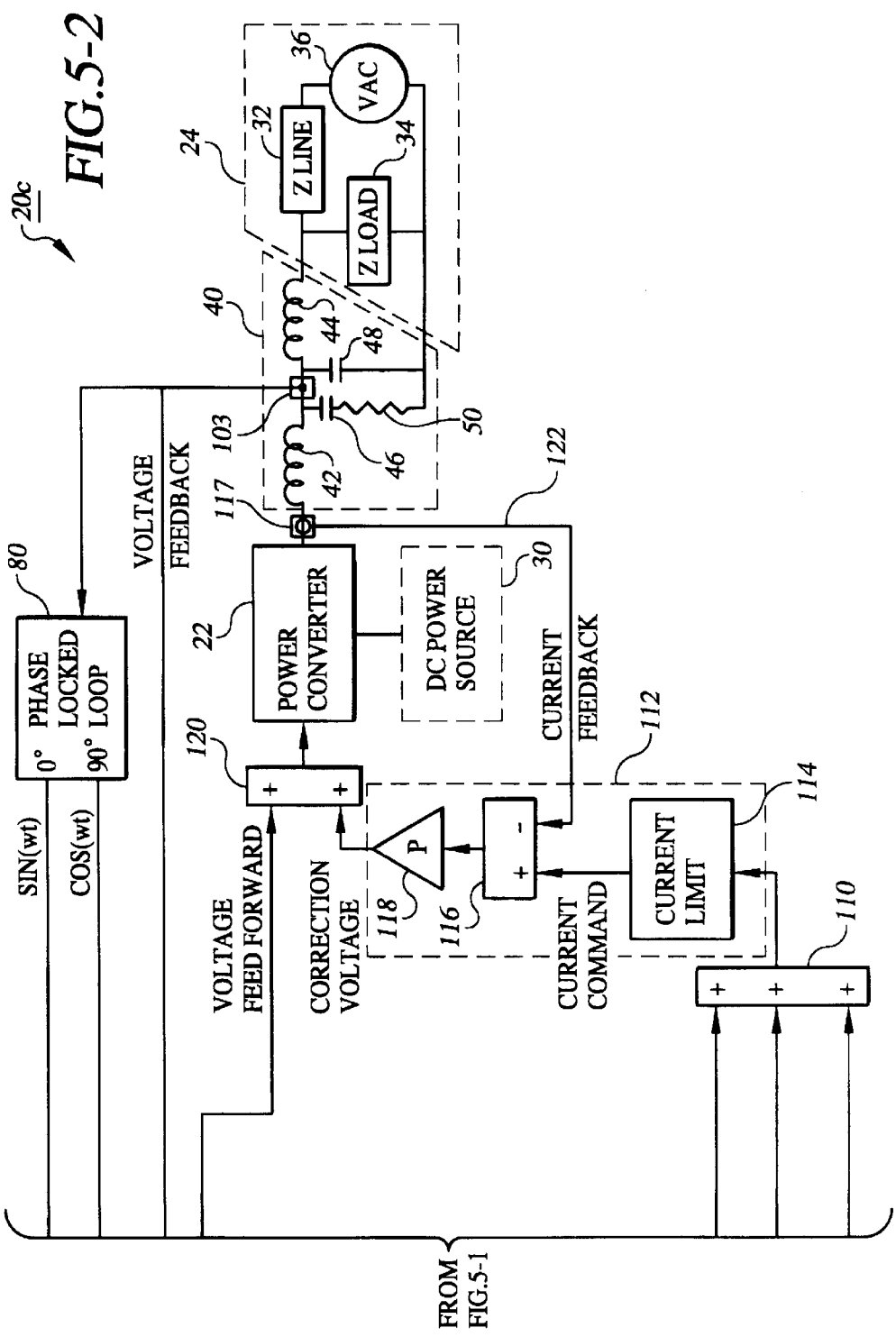

Turning now to FIGS. 5-1 and 5-2, in another embodiment of the present invention, identified as system 20c, impedance current regulator 106 of system 20 is replaced with impedance current regulator 106'. Otherwise, system 20c is identical to system 20.

Impedance current regulator 106' includes RMS unit 160 connected to receive the voltage feedback signal from tee point 52 of filter 40, and RMS unit 162 connected to receive the feed forward reference AC voltage from multiplier 70. RMS units 160 and 162 determine the root mean square value of the voltage signals they receive and provide RMS voltage signals as output.

Impedance current regulator 106' also includes a difference unit 164 for determining the difference between the RMS voltage signals provided as inputs thereto. Difference unit 164 generates a difference signal representing this difference in the RMS voltage signals and provides it to ABS unit 166. The latter takes the absolute value of the difference signal and provides the result to low pass filter 168, which filters the difference to provide the desired response time to the RMS difference signal. The filtered voltage difference signal is then provided to gain unit 170, which applies a gain function to the filtered difference signal from filter 168. In one embodiment, gain unit 170 includes a summing unit 172 and a gain 174 that provides $1/R_1$ gain signal to the summing unit. Gain unit 170 further includes a gain 176 that imposes a $1/R_2$ gain on the filtered voltage difference signal from filter 168, and provides the result to summing unit 172. The latter combines the $1/R_1$ signal with the voltage difference signal with the $1/R_2$ gain to develop an impedance current signal that is provided to multiplier 178.

There, the impedance current signal is combined with the voltage difference signal from difference unit 102 and is provided to summing unit 110. As described above relative to system 20, the resultant current signal provided by summing unit 110 is provided to current limit 114 in voltage correction unit 114.

Gain unit 170 has been described above as including a specific set of elements for accomplishing a particular function. Gain unit 170 may perform other functions, and so the present invention is not limited to the specific functions accomplished by the embodiment of the gain unit described above, nor the specific elements included in such embodiment.

In operation, system 20c increases the value of the 1/R gain applied to the output of difference unit 102 linearly with the difference of the RMS values of the voltage feed forward signal and the voltage feedback signal from RMS units 160 and 162, respectively. The control method of system 20c produces a response that will provide proportionally lower impedance (more restoring current) as the AC voltage at tee point 52 deviates from the nominal AC voltage. The effective value of 1/R will be $1/R_1 + [\text{rms}(V_{ff}) - \text{rms}(V_{fb})]/R_2$ where $V_{ff}$ is the voltage feed forward signal from multiplier 70 and $V_{fb}$ is the voltage feedback signal from tee point 52. The filtering lets the voltage feedback deviate for short term (within a line cycle) without a significant response from this term of the control circuit. If, however, the voltage changes for longer times system 20c will provide a stronger restoring current. This would allow a small correction for harmonics while providing a larger correction for fundamental voltage differences. This is useful in a system that has a large harmonic load in which harmonic correction is not required.

The value of $R_2 + R_1$ should be on the order of 3% to 10%, typically about 5% of the rated output voltage of power converter 22 divided by its rated output current, with $R_2$ roughly equal to $R_1$. The exact opposite response may be desired for some applications. In this case the value of $R_2$ would be negative. This would provide for a large correction for harmonics and a smaller correction for the fundamental voltage. This would be useful in a harmonic filter application that has little of no energy storage. The value of $R_2$ in this case would have a magnitude less than $R_1$, but with a negative sign.

Figure 6:
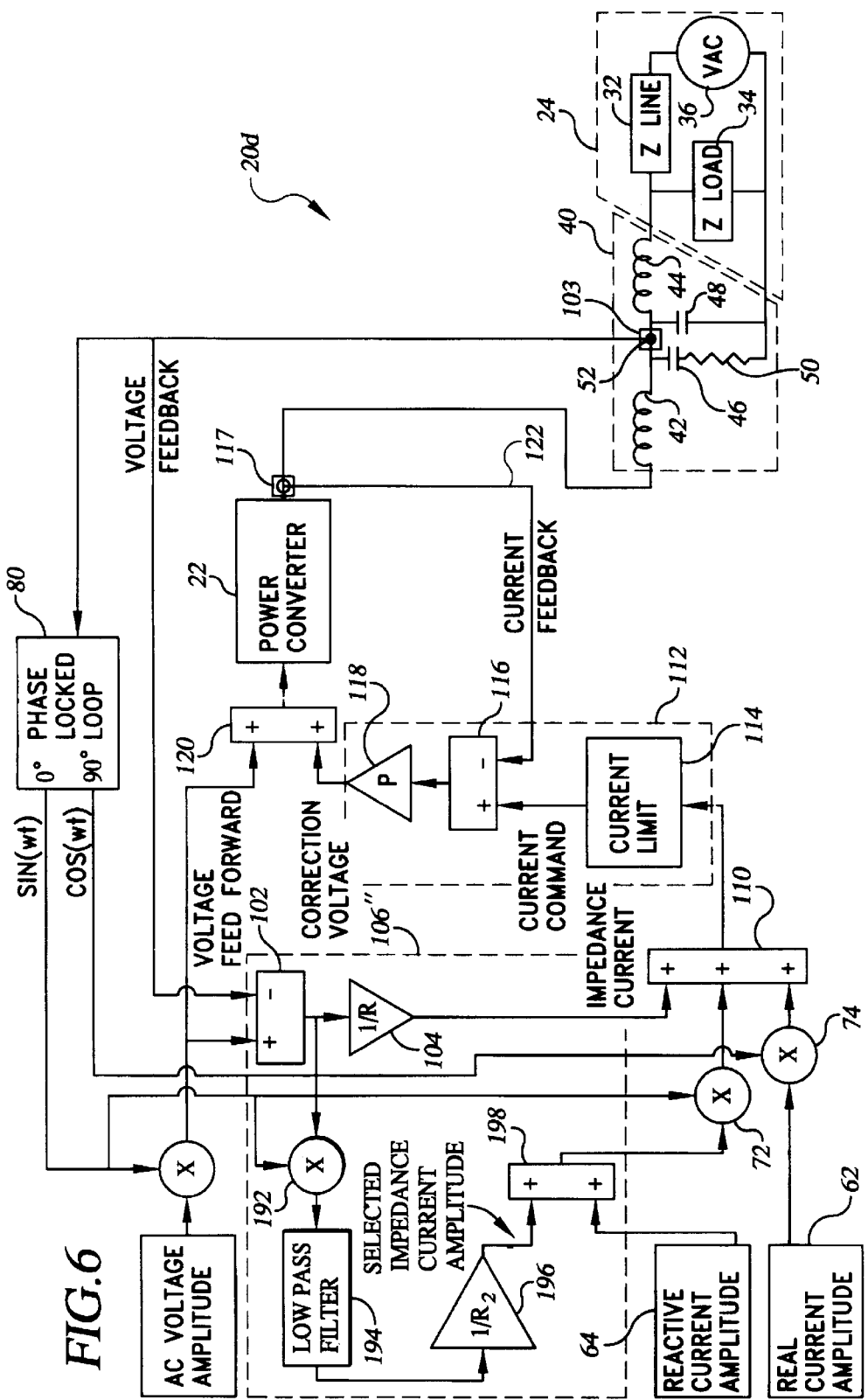
FIG. 6 is a schematic diagram of a control system that is similar to the one shown in FIG. 1, except that it includes a fundamental impedance current correction.

In some instances it may be desirable for impedance current regulator 106 to provide a low impedance (higher corrective current) for only selected frequencies, e.g., the fundamental frequency (50 or 60 Hz). Referring to FIGS. 1 and 6, this can be accomplished by including impedance current regulator 106" (FIG. 6) in system 20d in place of impedance current regulator 106 (FIG. 1) in system 20. Impedance current regulator 106", like impedance current regulator 106, includes difference unit 102 and 1/R gain 104. In addition, impedance current regulator 106" includes a multiplier 192 connected to receive as inputs the sine waveform from PLL 80 and the voltage difference signal from difference unit 102. Multiplier 192 multiplies the sine waveform by the voltage difference signal. Because this sine waveform is exactly in phase with the output voltage at tee point 52, multiplying the sine waveform by the voltage difference signal will result in the selected frequency, typically the fundamental frequency, going to DC.

This DC voltage difference signal, albeit with associated harmonics in some cases, is provided to low pass filter 194. This filter removes any harmonics present in the DC voltage difference signal, with the result that its output is the amplitude of the voltage difference determined by difference unit 102. This amplitude is multiplied by the gain $1/R_2$ at gain 196. The gain $1/R_2$ may be any function, with nonlinear functions that increase the value of $1/R_2$ with increasing input magnitude being of special interest (although the present invention also includes linear functions). In practice, the value for $R_2$ may be selected such that the inverse $1/R_2$ is between 2% and 10% of the rated output voltage of power converter 22 divided by its rated output current. The output of gain 196 is a selected impedance current signal.

Impedance current regulator 106" also includes summing unit 198 that sums the reactive current command signal from source 64 with the selected impedance current signal from gain 196. The result of this summing is provided by summing unit 198 to multiplier 72.

In operation, the inclusion of impedance current regulator 106" in system 20*d* provides an increase in amplitude of the impedance current signal at only the selected frequency, e.g., 50 or 60 Hz. This is desirable when higher corrective current at the fundamental frequency may be desired, to regulate the fundamental voltage. An example is the prime source of power in an isolated or soft grid, which cannot change its output level quickly.

Figure 7:
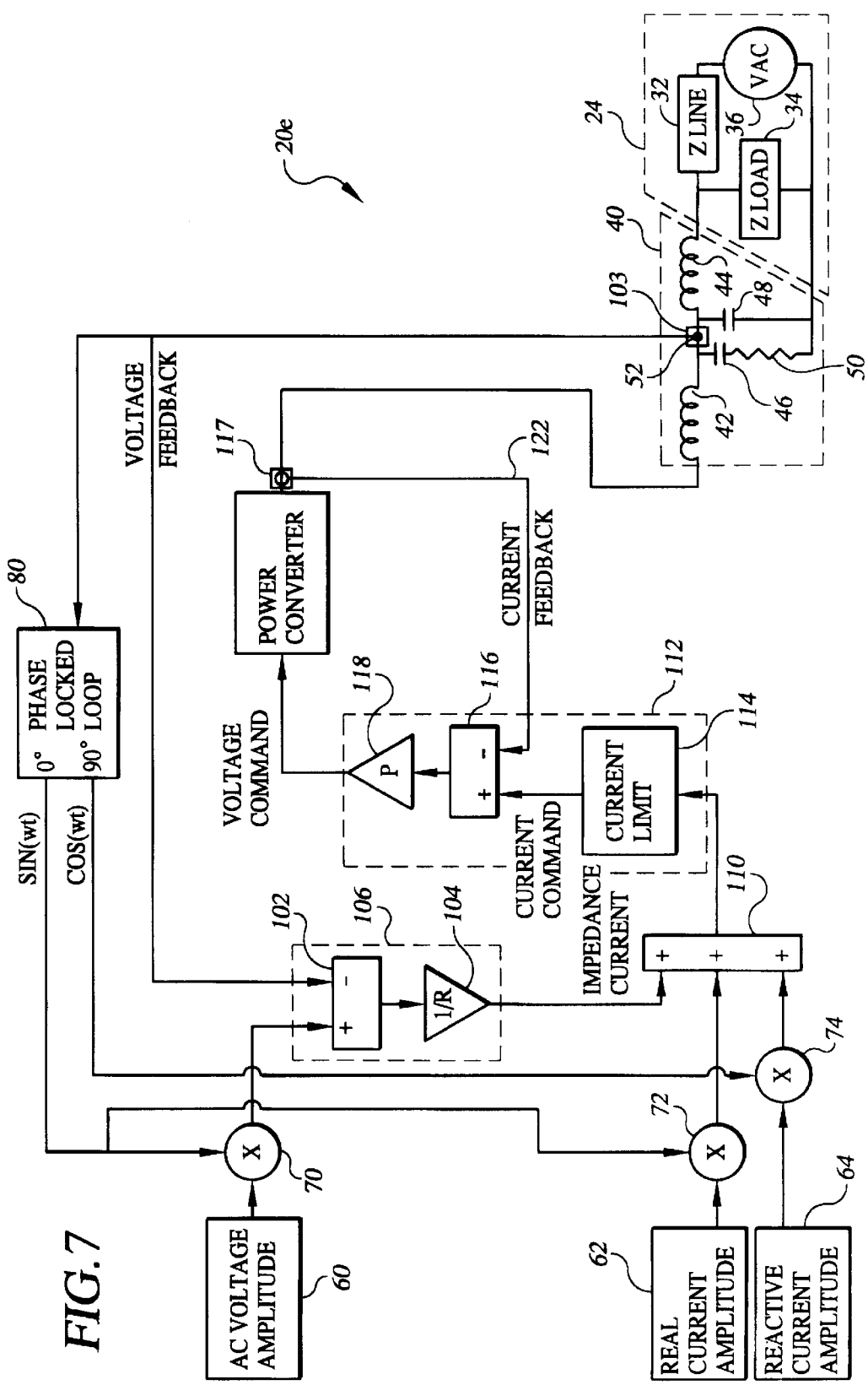
FIG. 7 is a schematic diagram of a control system similar to the one shown in FIG. 1, except that the voltage feed forward to the power converter is omitted.

Referring next to FIGS. 1 and 7, as shown in system 20*e* (FIG. 7), in some cases it may be desirable to eliminate the voltage feed forward signal provided to summing unit 120 (FIG. 1), which is combined with the voltage feed forward signal and provided to power converter 22. Thus, in system 20*e*, no voltage feed forward signal from multiplier 70 is provided, and summing unit 120 is eliminated.

The impact of not using the voltage feed forward signal on the operation of system 20*e* is that a higher gain P is required in the current loop. In general voltage feed forward is desired, but if the bandwidth of a system 20 is very high, then the voltage feed forward signal can be eliminated.

Figure 8:
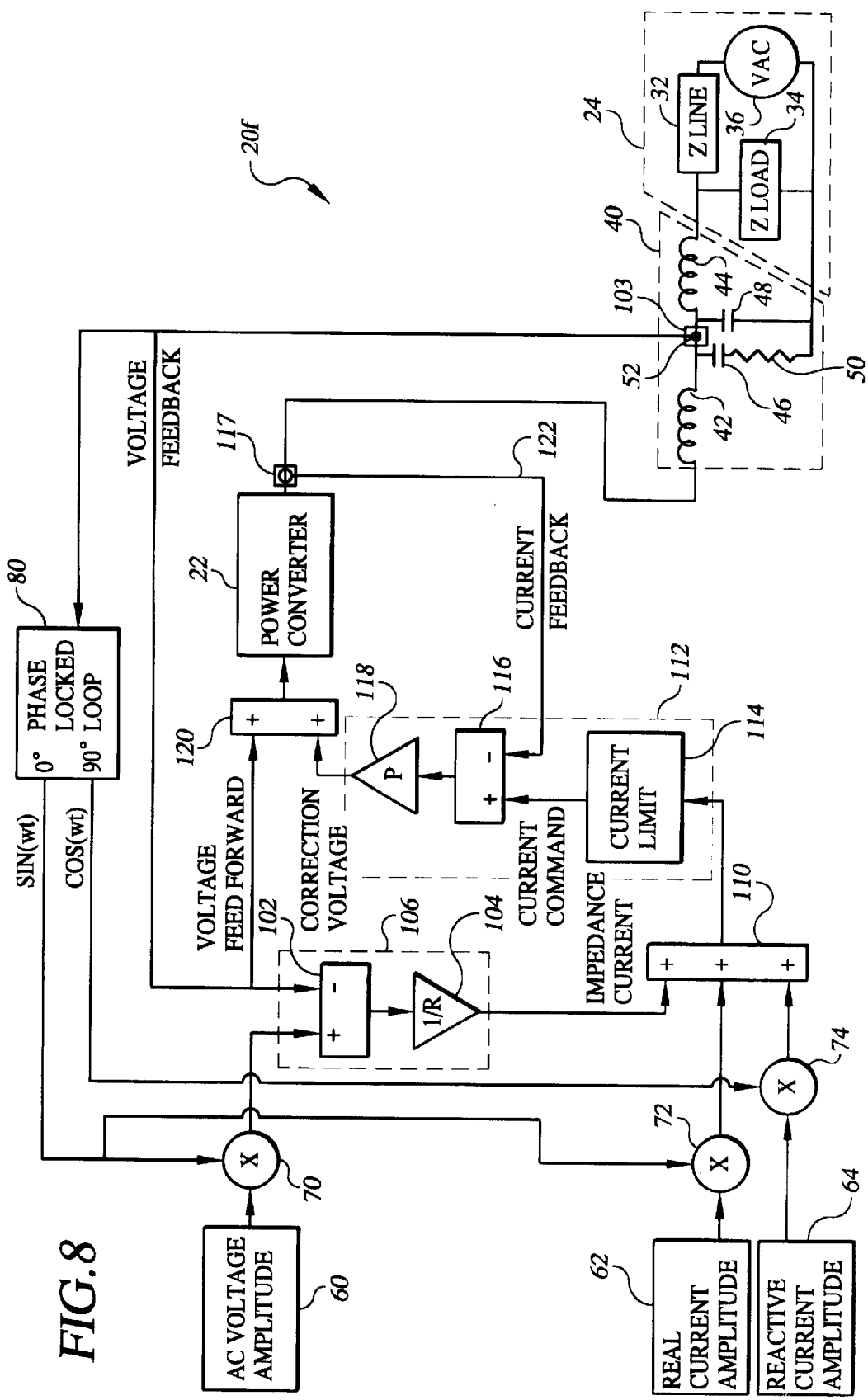
FIG. 8 is a schematic diagram of a control system similar to the one shown in FIG. 1, except that the voltage feed forward to the power converter comes from the output thereof, rather than from the reference AC voltage source.

In an alternative to system 20*e*, the voltage feedback signal from tee point 52 may be used as the voltage feed forward signal, as illustrated with system 20*f* in FIG. 8. Thus, the voltage feedback signal from tee point 52 is provided to both difference unit 102 and to summing unit 120. In operation, similar performance is achieved relative to other versions of system 20, as discussed herein.

Figure 9:
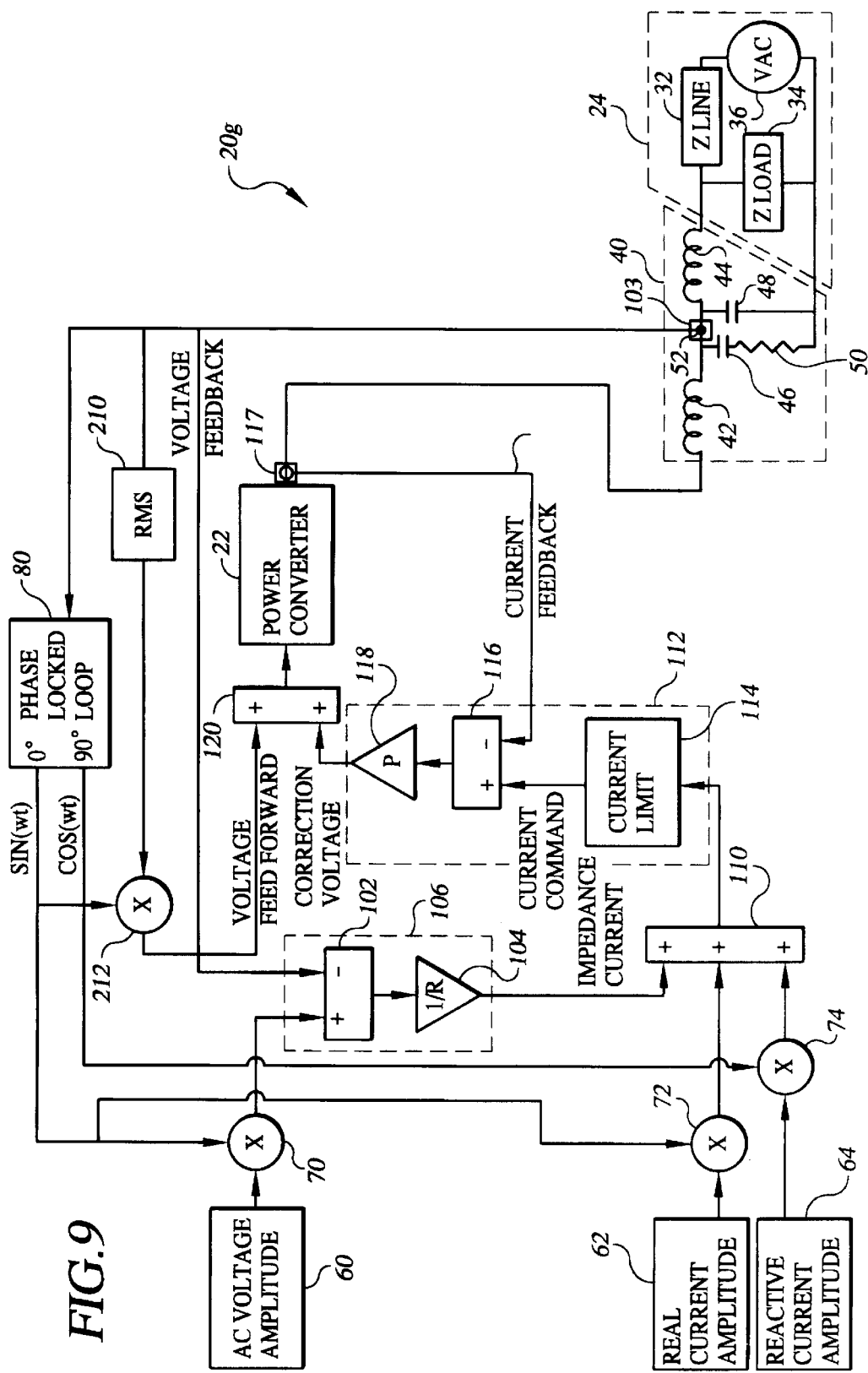
FIG. 9 is a schematic diagram of a control system similar to the one shown in FIG. 1, except that the voltage feed forward into the power converter is developed as a function of the output voltage and current thereof, rather than as a function of the output of the reference AC voltage source.
Figures 1, 10:
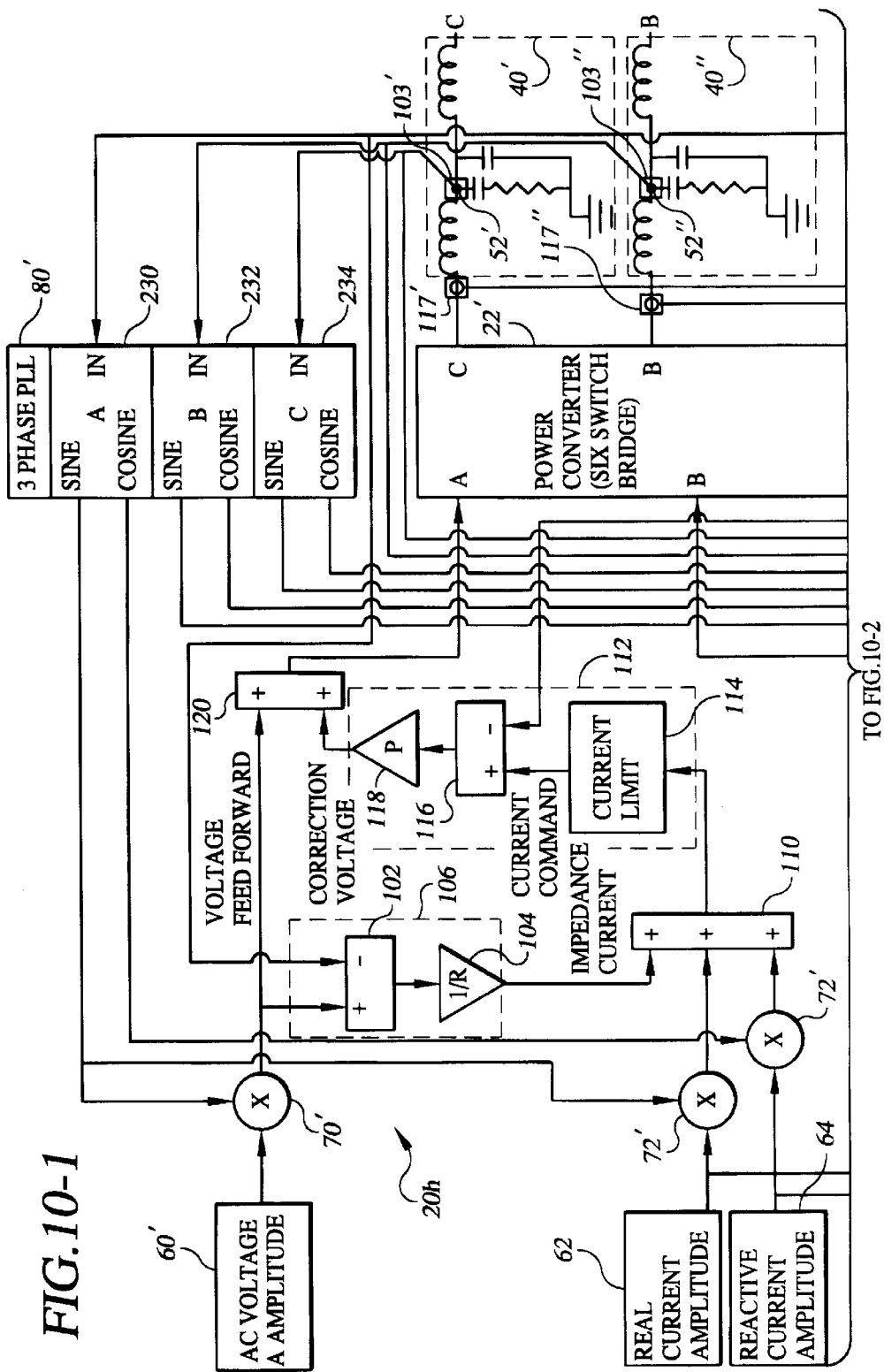
Figures 2, 10:
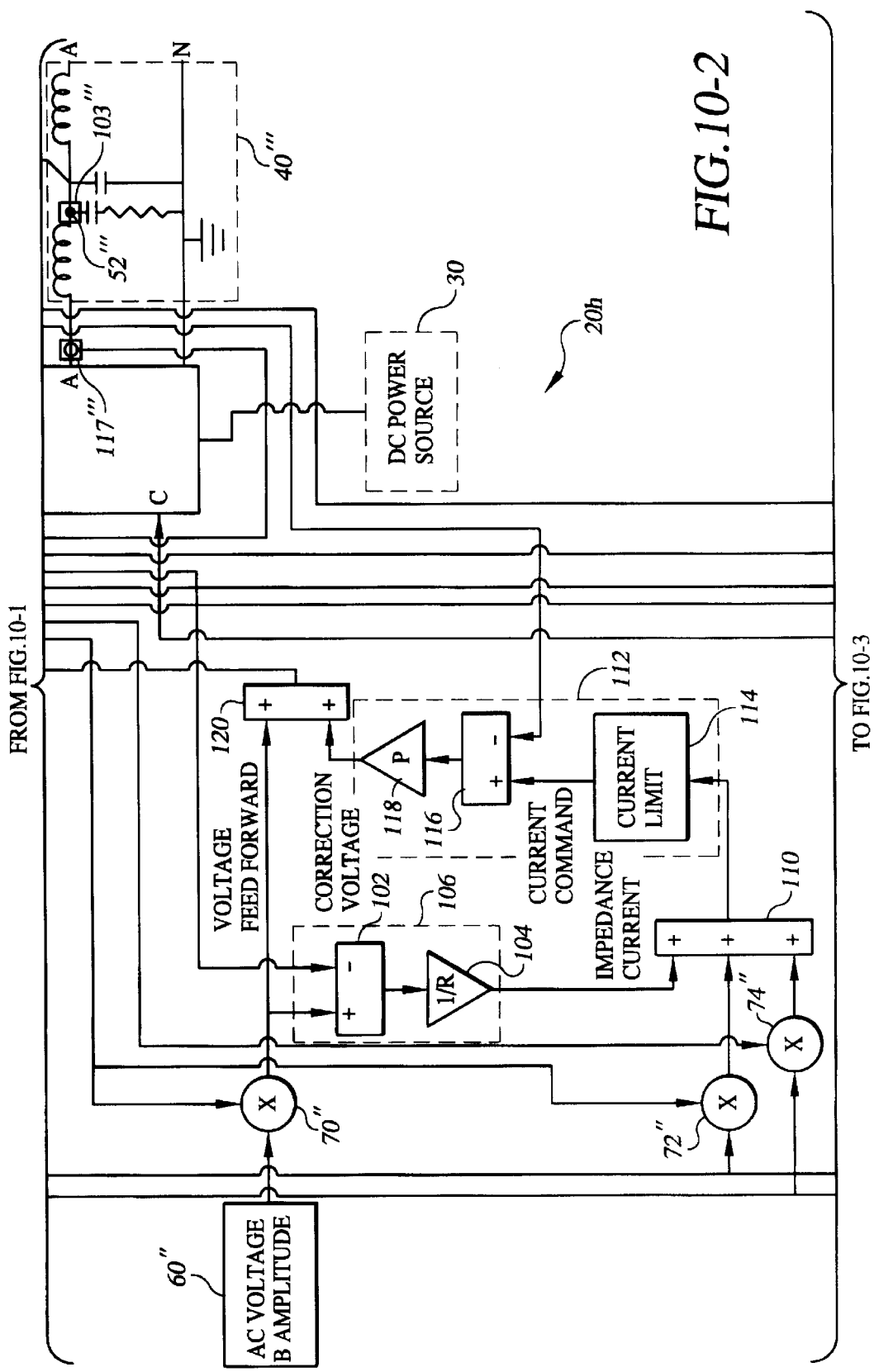
Figures 3, 10:
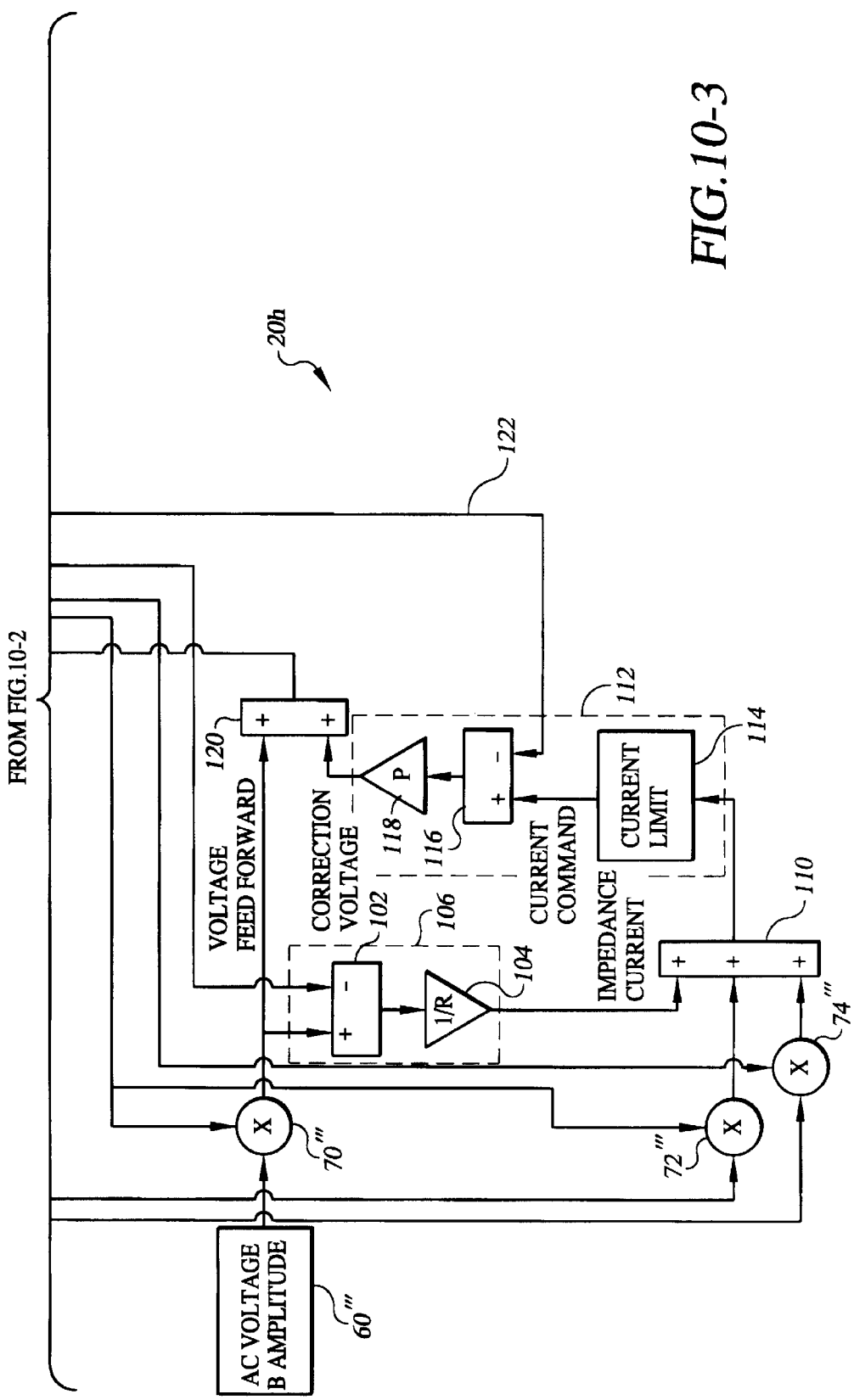
Figures 1, 11:
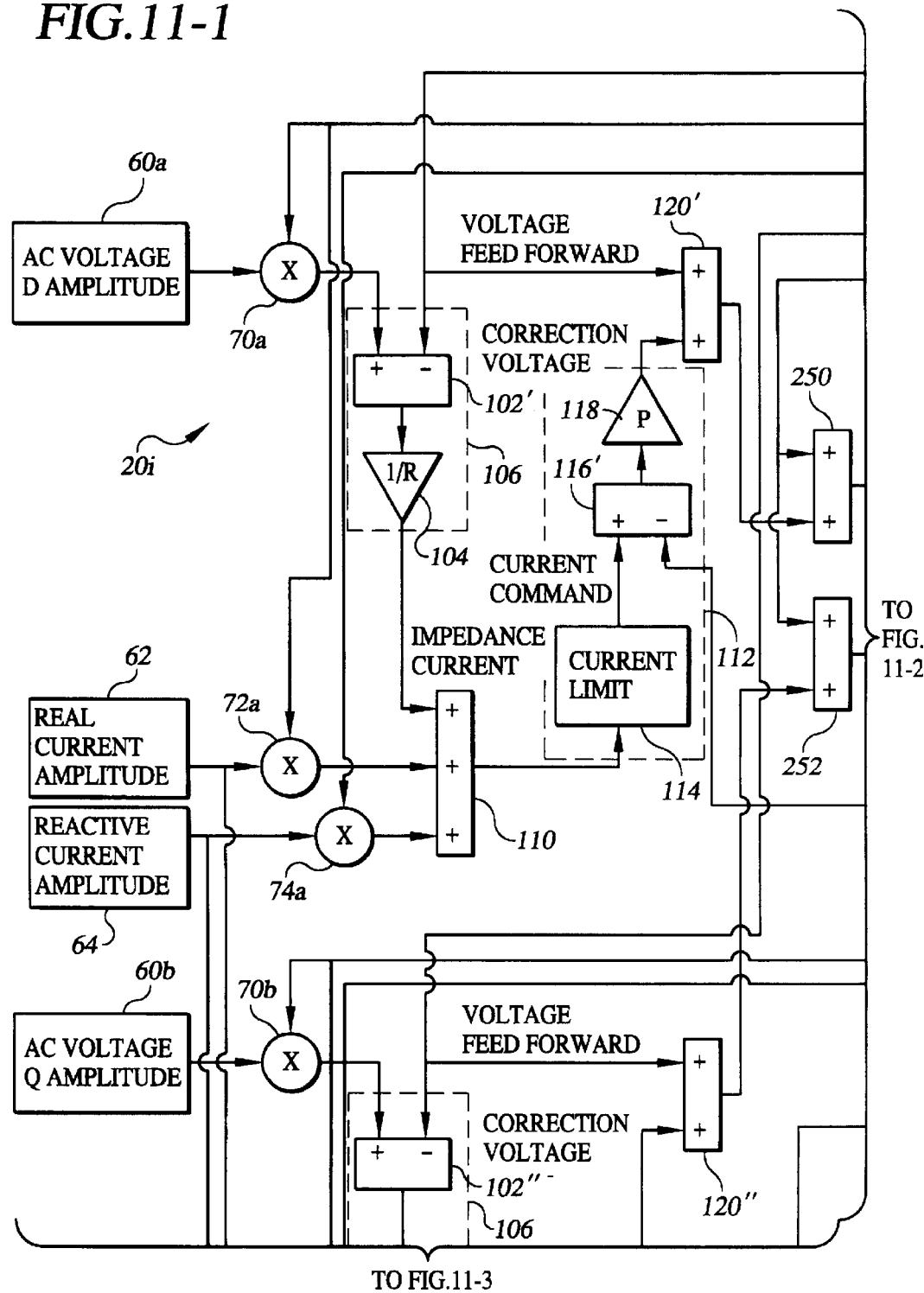
Figures 3, 11:
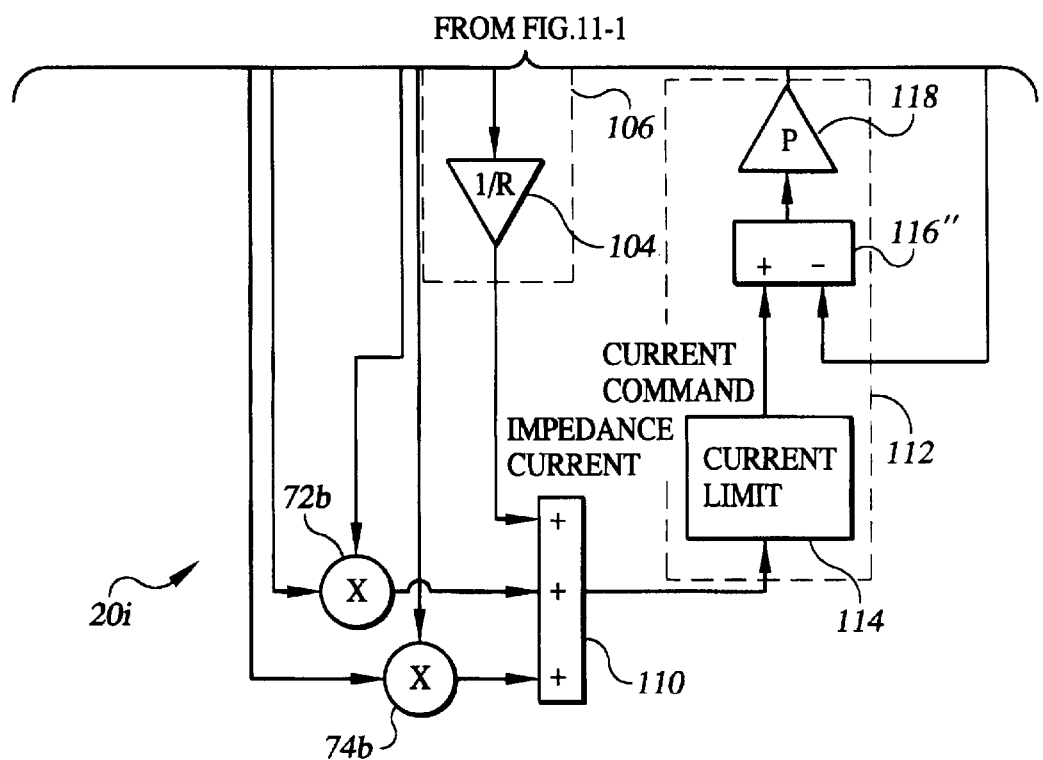

Yet another way to generate the voltage feed forward signal ultimately provided to power converter 22 is illustrated in FIG. 9 with respect to system 20*g*. In this embodiment, as with system 20*f*, the feed forward voltage is not received from multiplier 70. Instead, the voltage feedback signal from tee point 52 is provided to RMS unit 210, where the root mean square of the voltage feedback signal is determined. This RMS voltage signal is then provided to multiplier 212, where the sine waveform from PLL 80 is imposed on the RMS voltage signal. The output signal from multiplier 212 is then provided to summing unit 120 where it is combined with the correction voltage signal from gain 118 and then provided to power converter 22.

The operation of system 20*g* is influenced by the fact that the voltage signal provided from summing unit 120 to power converter 22 is a function of the actual amplitude of the output voltage at tee point 52, rather than the expected voltage (as is the case for system 20 shown in FIG. 1). This makes the expected voltage match the RMS value of the actual voltage so that the invention will not work too hard to try to control the RMS voltage. This version of the invention is ideal for situations when system 20*g* will be put in parallel with a central system that behaves as a voltage source and has a relatively large variation in RMS voltage.

Turning next to FIGS. 1 and 10-1, 10-2 and 10-3, any of systems 20, and 20*a–g*, described above, or other alternatives encompassed by the present invention, may be implemented in a three-phase, four-line environment, as illustrated in FIGS. 10-1, 10-2 and 10-3 relative to system 20*h*. To minimize duplication, only the voltage feedback and feed forward signal schemes from system 20 are shown in system 20*h*. However, the present invention encompasses the use of any of the control schemes of systems 20 and 20*a–20g*, or otherwise encompassed by the present invention, in system 20*h*. Thus, reference to system 20 (and the associated FIG. 1 in which the system is illustrated) in connection with the discussion of system 20*h*, as well as in the discussion of other embodiments of the invention illustrated in FIGS. 11-1, 11-2, 11-3 and 12–16 of system 20 is intended to cover the specific system 20 shown in FIG. 1, systems 20*a–20g*, and all other variations of these systems encompassed by the present invention. Thus, reference in the following description of the invention to system 20, and FIG. 1 in which the system is illustrated, is merely a convenient way to identify all variations of the control system of the present invention, is not intended to limit the invention to just the particular system illustrated in FIG. 1. In FIGS. 1 and 10-1, 10-2 and 10-3, like elements are referred to with like reference numbers, except that the prime notation is used in some instances in FIGS. 10-1, 10-2 and 10-3 to distinguish multiple instances of the same element.

System 20*h* comprises three single-phase systems, one for controlling each of the three phases. System 20*h* includes power converter 22', which is similar to power converter 22 except that it is designed to provide AC output power for each phase at output nodes A, B and C, and it also includes an output node N to ground. Power converter 22' includes input nodes A, B and C for receiving input control signals. A power converter having a six-switch bridge may be satisfactorily used as power converter 22', although a wide range of power converters and inverters may be used as power converter 22', as described above relative to power converter 22. Three filters 40', 40" and 40''' are provided to receive the AC power output from, respectively, nodes A, B and C or power converter 22'.

System 20*h* also includes a source 62 for a real current command signal and a source 64 for a reactive current command signal. The real current command signal from source 62 is provided to multipliers 72', 72" and 72''', and the reactive current command signal is provided from source 64 to multipliers 74', 74" and 74'''. Although common AC real and reactive current sources are used for all three phases, separate sources may be used if so desired. Three sources 60', 60" and 60''' are included in system 20*h* for providing a reference AC voltage. The voltage signal from source 60' has an amplitude A, the voltage signal from source 60" has an amplitude B and the voltage signal from source 60''' has an amplitude C. Typically, amplitudes A, B and C are all the same, although in general cases some or all of the amplitudes may be different. System 20*h* includes a three-phase PLL 80' having sections 230, 232 and 234, each for generating a sine waveform signal and cosine waveform signal having a phase that differs from the phase of the other sections.

As described above relative to PLL 80, the present invention encompasses a wide variety of PLLs of the type known to those skilled in the art. Section 230 receives as its input a signal from tee point 52' in filter 40', section 232 receives as its input a signal from tee point 52" in filter 40" and section 234 receives as its input a signal from tee point 52''' in filter 40'''. The sine waveform signal from section 230 is provided to multiplier 70' and multiplier 72', and the cosine waveform signal from section 230 is provided to multiplier 74'. Similarly, the sine waveform signal from section 232 is provided to multiplier 70" and multiplier 72", and the cosine waveform signal from section 232 is provided to multiplier 74". Also, sine waveform signal from section 234 is provided to multiplier 70''' and multiplier 72''', and the cosine waveform signal from section 234 is provided to multiplier 74'''. The PLLs in each of sections 230, 232 and 234 are synchronized to help simplify on/off control, although this is not a required aspect of the present invention.

Each phase section of system 20h functions like system 20, as described above. Thus, for example, the phase section receiving input signals from multipliers 70', 72' and 74' uses these signals to ultimately provide a control voltage input signal from summing unit 120 to input node A of power converter 22'. Similar control voltage input signals are provided from the summing units 120 for the two other phases to input nodes B and C of power converter 22'. The latter then converts DC power provided from DC power source into AC power in accordance with the control voltage input signals received at its input nodes A, B and C, and provides three-phase output voltage, through filters 40', 40" and 40''', to an AC power network (not shown). In addition to the above four-wire control, those skilled in the art of motor drive and converter control will appreciate there are other configurations based on a three-wire controller with neutral controller that can be used for four-wire control by rearranging the controller in a similar way to that shown below.

The power converter control system of the present invention may also be applied to a three-phase, three-wire power system, as illustrated in FIGS. 11-1, 11-2 and 11-3 relative to system 20i. Instead of including three current control loops, as in system 20h, system 20i only includes two current control loops because only two currents are to be controlled. Thus, power controller 22a is similar to power controller 22' (FIGS. 10-1 and 10-2), except that it includes only output nodes A, B and C, and not node N. The first current control loop includes as its inputs a reference voltage signal from multiplier 70a, a real current command signal from multiplier 72a and a reactive current command signal from multiplier 74a. The second current control loop includes as its inputs a reference voltage signal from multiplier 70b, a real current command signal from multiplier 72b and a reactive current command signal from multiplier 74b.

System 20i further differs from system 20h in that the voltage feedback signals from tee points 52', 52" and 52''' are provided to a Clark transformer 240. This transformer converts the three-phase input signals from power converter 22a into a direct (D) voltage feedback signal and quadrature (Q) voltage feedback signal, which are provided to PLL 80a. This PLL generates a direct (d) output sine waveform in phase with the direct (D) voltage feedback signal and a quadrature (q) output sine waveform in phase with the quadrature (Q) voltage feedback signal. The direct (d) output sine waveform is provided directly to multipliers 70a and 72a, and the quadrature (q) output sine waveform is provided directly to multipliers 74a, 70b and 72b. The direct (d) output sine waveform from PLL 80a is also provided to inverse gain 242, which changes the sign of the sine waveform (shifts the phase 180 degrees) and then provides the resultant sine waveform to multiplier 74b.

PLL 80a also generates a neutral point feed forward signal (NPFF) used in controlling the difference between the DC and the AC neutral that is sometimes required for a three-wire power converter to operate at minimum DC input voltage. This NPFF signal is typically a third harmonic signal which represents approximately 14% of the full-scale voltage of power converter 22. The NPFF signal is provided by power converter 22a via NPFF node to summing units 250 and 252. Summing unit 250 sums this NPFF signal with the voltage signal from summing unit 120' in the upper current control loop in system 20i and summing unit 252 sums the NPFF signal with the voltage output signal from summing unit 120" in the lower current control loop in system 20i. Before being provided to PLL 80a, the direct (D) feedback signal is also provided directly to difference unit 102' in the upper current control loop and the quadrature (Q) voltage feedback signal is also provided directly to difference unit 102" in the lower current control loop.

System 20i also includes a Clark transformer 254 connected to receive at input nodes A and B, respectively, current feedback signals from output nodes B and C of power converter 22a. Input C of Clark transformer 254 receives the summed inverse of current feedback signals from output nodes B and C of power converter 22a. This is achieved by providing these current feedback signals to summing unit 256 and then providing the summed current signal to inverse gain 258. The inverse current signal output from inverse gain 258 is then provided to input node C of Clark transformer 254. Like Clark transformer 240, Clark transformer 254 converts its three current signal inputs to two current signal outputs, a direct (D) current feedback signal and a quadrature (Q) current feedback signal. The direct (D) current feedback signal is provided to difference unit 116' in the upper current control loop of system 20i in FIG. 11-1 and the quadrature (Q) current feedback signal is provided to difference unit 116" in the lower current control loop of system 20i in FIG. 11-2.

Because power converter 22a requires three input control signals, one for each phase, an inverse Clark transformer 260 is provided. The voltage control signals from summing units 120' and 120" are each combined with the NPFF signal from PLL 80a, and then are provided to input nodes D and Q of inverse Clark transformer 260. The latter then generates output control signals on nodes A, B and C that are provided to power converter 22a. Based on these control signals, power converter 22a converts DC power from DC power source 30 into AC power provided via output nodes A, B and C, respectively, to filters 40', 40" and 40''' and then on to the AC power network (not shown).

System 20i functions similarly to system 20h in that separate control sections are used. However, inclusion of only two control sections and use of the Clark transformers 240 and 254, and the inverse Clark transformer 260, permits use of system 20i in a three-phase, three-wire power system, because there are really only two unique current to control given that $i_a + i_b + i_c = 0$.

Figure 12:
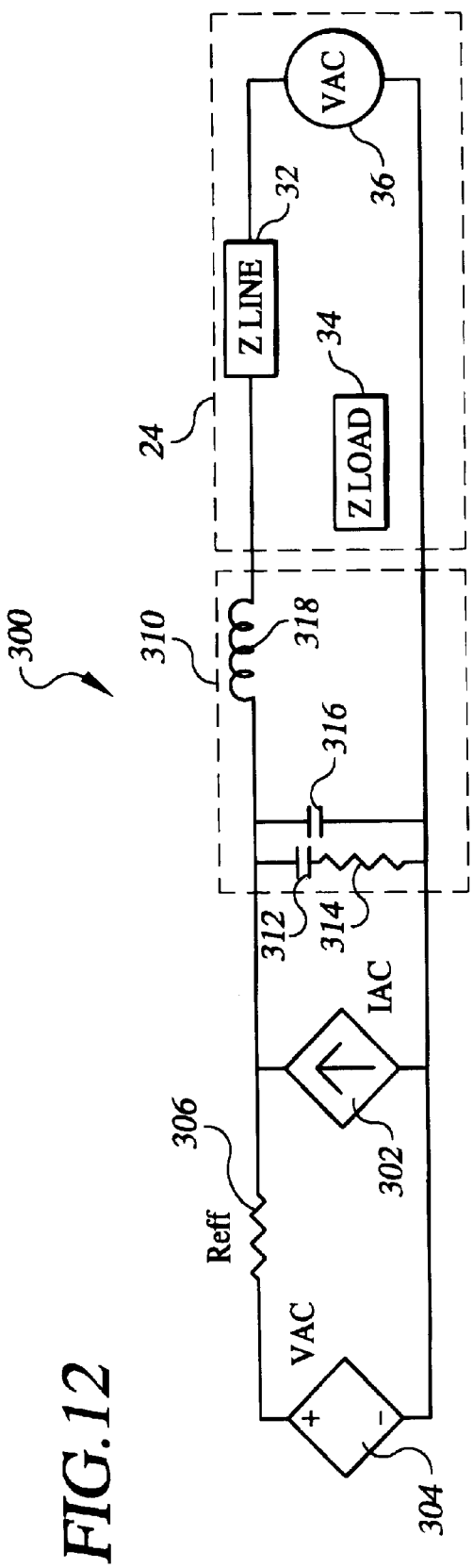
FIG. 12 illustrates an effective model of the control system of the present invention.

Turning next to FIGS. 1 and 12, the control system of the present invention may be represented by model 300. The current command signal provided from sum of the signals from multipliers 72 and 74 can be considered to control a dependant current source (IAC) 302, and the voltage command signal provided from output of multiplier 70 can be considered to control a dependent voltage source (VAC) 304. These sources are connected in parallel to one another and to AC power network 24, and must be considered synchronized to the output voltage. An effective resistance ($R_{eff}$) 306 is connected between VAC source 304 and IAC source 302. $R_{eff}$ 306 represents the impedance control provided by the control system of the present invention. The value of $R_{eff}$ is the same as the R in gain 104 in impedance current regulator 106, as described above. Note, $R_{eff}$ is not a real resistor and has no power loss; it simply represents a resistance that power converter 22 mimics.

Model 300 includes filter 310 that has a capacitor 312 connected in series with resistor 314. This capacitor/resistor combination is connected in parallel to IAC 302 and VAC 304. A second capacitor 316 is provided in filter 302 and is connected in parallel with capacitor 312 and resistor 314. Filter 310 further includes an inductor 318 between capacitor 316 and AC power network 24. Filter 302 does not include a first inductor, like inductor 44 in filter 40 (FIG. 1), because it has no effect on the performance of this effective model due to its inclusion inside the current control loop.

Model 300 can be used to understand how the control system of the present invention behaves. If the current command signals from sources 62 and 64 are zero and the voltage command signal from source 60 equals the output voltage of power converter at tee point 52, there will be no current coming out of the power converter. If there is a disturbance of the output voltage, current will flow from VAC 304 to AC power network 24 to help restore the voltage to its original value. This disturbance could be a rise or drop in voltage, a harmonic voltage or a switching transient, or anything else that makes the voltage deviate from a pure sine wave at the desired voltage.

Consider the case where the voltages from tee point 52 and multiplier 70 are matched as before and a current command is added. If AC power network 24 is a stiff low impedance network, where power converter 22 is a small part of the network power, the current command will go to the AC power network with little change in the voltage at tee point 52. Thus, the impedance current regular 106 will not modify the current command signal provided at the output of summing unit 110 by much. However, if power converter 22 is a significant factor in AC power network 24, where the voltage would change significantly if that current where imposed on the network, then the impedance current control loop including regulator 106 will pull a large percentage of the current back and thus keep the power network voltage in tolerance.

Figure 13:
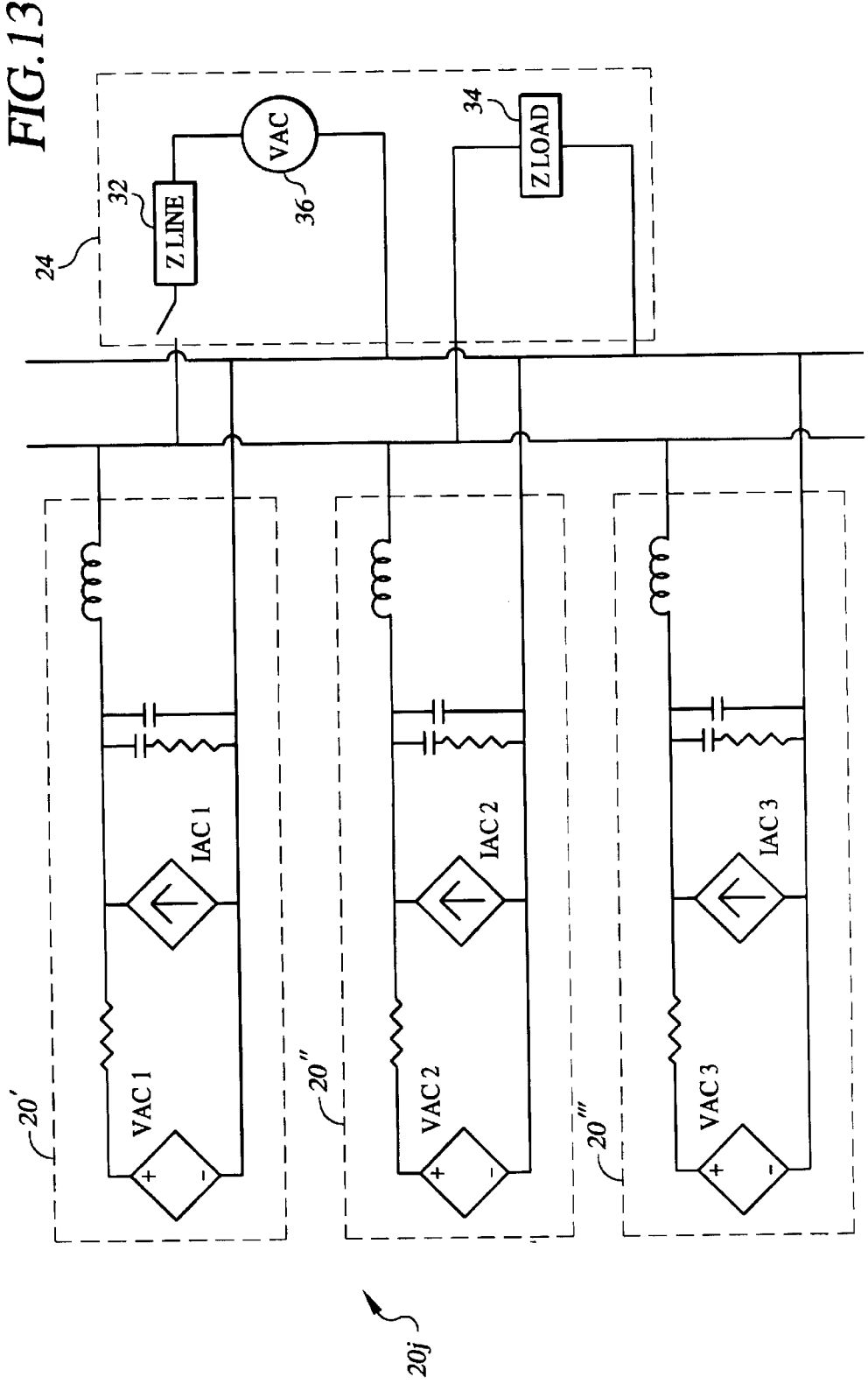
FIG. 13 is a schematic diagram showing three control systems of the type illustrated in FIG. 1 connected in parallel to a single load.

While system 20, and its variations discussed above and otherwise included in the present invention, may be used individually, desirable results are achieved when multiple ones of system 20 are connected in parallel with single or plural loads. Referring next to FIGS. 1, 12 and 13, and using model 300 as shorthand way to depict a system 20, plural ones of such system, identified as systems 20', 20", 20''', may be connected in parallel with AC power network 24, as shown relative to system 20j (FIG. 13). While three systems 20 are illustrated in parallel connection in FIG. 13, it is to be appreciated that two or more than three, substantially more than three in some applications, may be used in parallel configuration.

Figure 14:
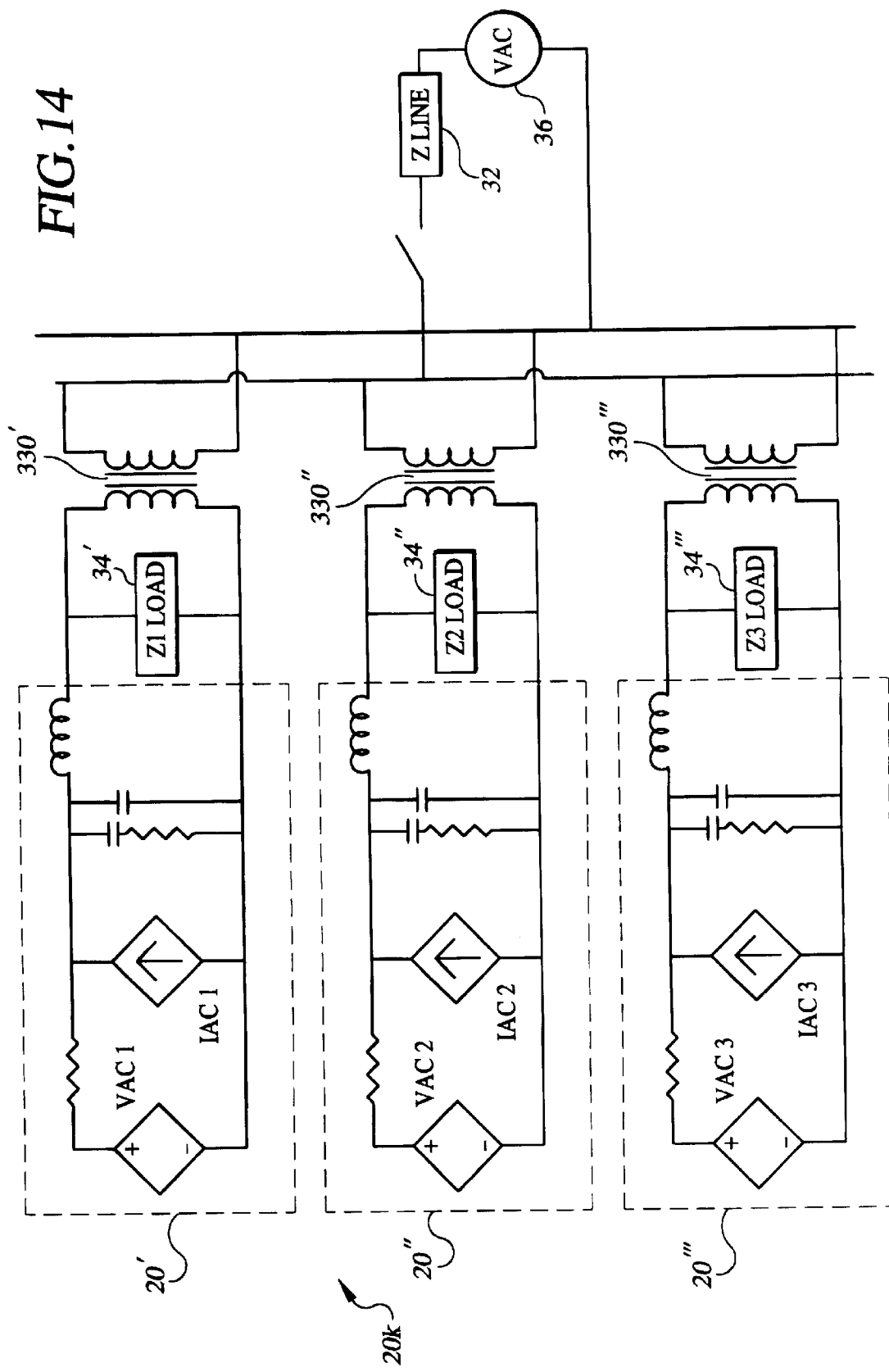
FIG. 14 is a schematic diagram of control systems similar to the one shown in FIG. 13, except that each control system is connected to a respective load rather than all of the control systems being connected to a single load.

Turning next to FIGS. 1 and 12–14, instead of supporting a single load 34, systems 20', 20", 20''' may be each connected, respectively, to a separate load impedances 34', 34", 34''', as illustrated in FIG. 14 relative to system 20k. In system 20k, transformers 330', 330", and 330''' are connected, respectively, in parallel with load impedances 34', 34" and 34''' between the load impedance and the single line impedance 32 and EMF 36. Transformers 330', 330" and 330''' are not needed if systems 20 are close together. Again, while three systems 20 are illustrated in parallel connection in FIG. 14, it is to be appreciated that two or more than three, substantially more than three in some applications, may be used in parallel configuration.

Various benefits are achieved by paralleled system 20k and 20j. If there is a surge in current, systems 20', 20", 20''' all work together to address this situation since the behavior of each system is influenced in part by power attributes of AC power network 24 (based on the information in signals from tee point 52).

By paralleling the systems 20', 20", 20''', a large amount of current may be supplied by the associated DC power converters 22 so as to clear a current fault. In the case of a surge, voltage is supported and equipment connected to AC power network 24 is protected from an over-current situation. This occurs because each of systems 20', 20" and 20''' work together to optimally provide and/or absorb voltage and current with their associate DC power supplies 30 until the surge is over. System 20j provides a high reliability power system that is made of a large number of small systems working together.

The present invention also permits the use of a number of smaller and less expensive power converters 22 that together cost less than a single power converter suitable for the entire load requirements of AC power network 24. For a larger network (e.g., five or more systems 20) the peak power rating of each individual power converter 22 can be lower than if each unit had to supply its own peak power. For example, a residential specification for a standalone fuel cell, might require 7 kW average power and a peak rating of 20 kW. With system 20k, a connection of ten systems 20 on AC power network 24 could provide a power rating of 7 kW continuous and 10 kW peak. In this case, two or more loads could still peak at a time depending on the total system load. Consider another way, the total system 20k could run a load with a power rating of 70 kW continuous with a peak of 100 kW, with the system incorporating relatively small and inexpensive power converters 22.

Considering further the operation of system 20k, the DC power sources 30 associated with each power converter 22 may be used to support a number of loads in a widely dispersed power distribution system. This network could be a three-phase industrial network or a single-phase residential network. In this type of application, the systems 20', 20", and 20''' all share the base load, represented by load impedances 34', 34" and 34''', the line load, represented by line impedance 32, EMF 36, and the associated peaks, the transients and the harmonics.

Systems 20j and 20k, in a typical implementation, enjoy important redundancy. Assume each of systems 20', 20", and 20''' is supported by a bi-directional energy source, such as a fuel cell with a battery for transients. (There could be any number of systems 20 here—in fact the more there are the better the system performs.) Assume also the total capacity of any three energy sources can support the load. Here there are four sources, three DC power sources 30 and AC power network 24. Systems 20j and 20k have built-in redundancy due the fact that only three sources are required to keep it running. To simplify understanding of this redundancy, assume systems 20', 20", and 20''' are of all equal size (although they can be of any size).

Figure 15:
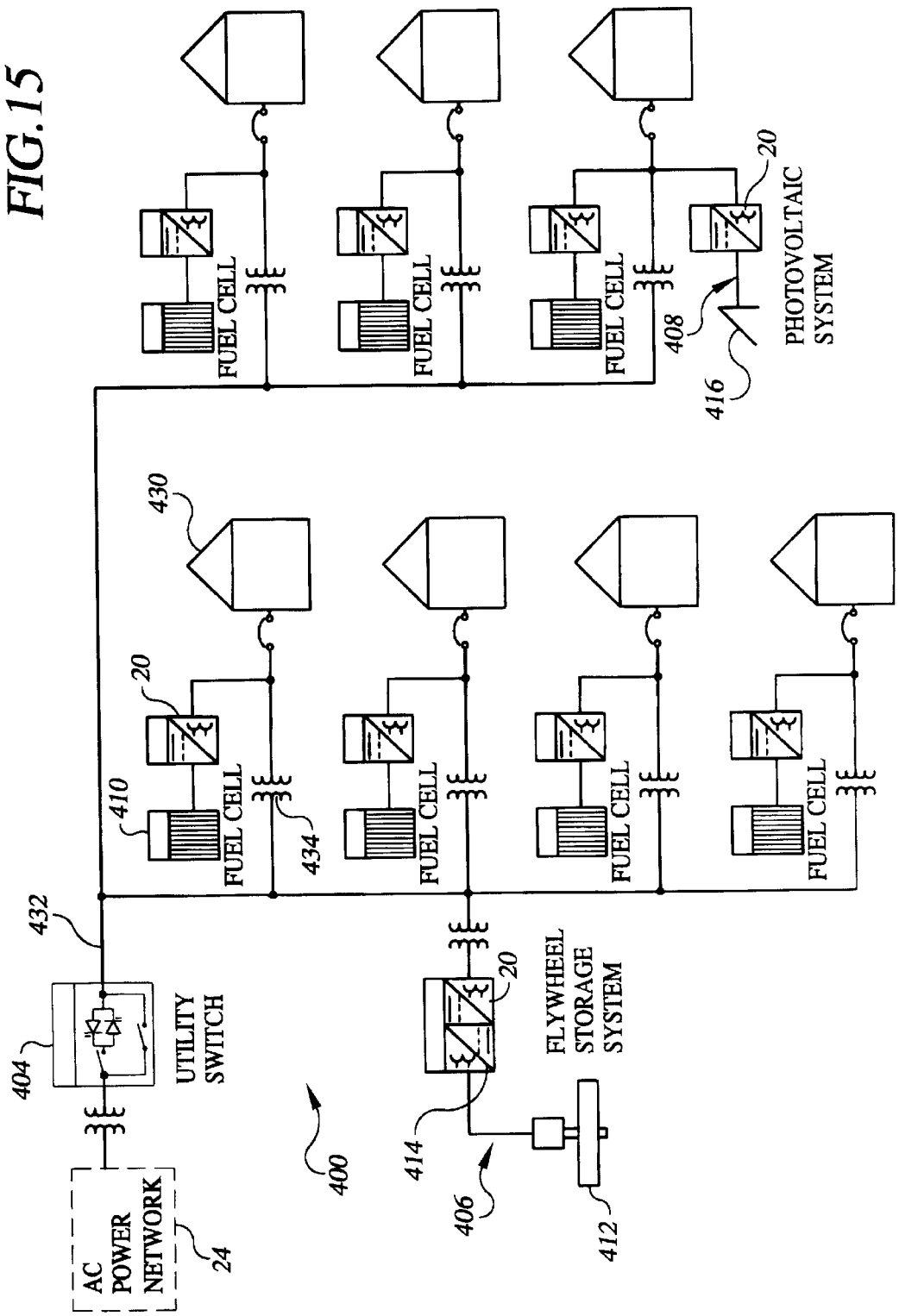
FIG. 15 is a schematic diagram of a distributed generation power network including multiple installations of the control system of the present invention.

Referring now to FIGS. 1 and 15, system 20 may be beneficially used in a distributed generation (DG) power network 400. The DG network 400 shown in FIG. 15 is a residential network. However, it is to be appreciated that DG networks 400 with which system 20 may be used include any combination of residential, commercial and industrial power consuming entities (and power providing entities as well, in some cases).

DG network 400 is connectable with an AC power network 24, e.g., a utility power grid. A utility switch 404 may be provided to selectively connect and disconnect DG network 400 from AC power network 24, but the switch is not mandatory. DG network 400 includes, for example, one or more DC power sources such as flywheel storage system 406, photovoltaic system 408 and fuel cells 410. Flywheel storage system 406 includes a flywheel 412, an active rectifier 414 and a system 20. Photovoltaic system 408 includes a photovoltaic array 416 and a system 20. Each residence includes a fuel cell 410 and an associated system 20.

In the exemplary DG network 400, photovoltaic array 406, fuel cells 410, flywheel 412, and battery 414 all constitute DC power sources 30, as described above in connection with the description of system 20. Although not shown, DG network 400 may include DC power sources 30 that generate power from any fuel. Indeed, DG network 400 may include any source of power. Further, AC power network 24 is not limited to a utility grid; any source of AC power may be provided by network 24.

Each residence 430 is connected directly to AC power network 24 via distribution line 432, with transformers 434 appropriately interposed. Flywheel storage system 412, via system 20, is also connected to distribution line 432, as is photovoltaic system 408 via its system 20. The fuel cell 410 associated with each residence 430 is also connected to the residence via its associated system 20.

In operation, DG network 400 allows the collection of residences 430 to operate as an independent power network. Such independent operation may be desirable, for example, when power can be provided by sources within the independent power network, e.g., fuel cells 410, less expensively than from AC power network 24. Also, if power quality from AC power network 24 does not meet desired standards, or the network is temporarily unable to provide power, independent operation may be desirable. Yet another advantage of using systems 20 within DG network 400 is that current faults and surges, along with transients and harmonics, from AC power network 24 can be compensated for by the systems 20, as discussed above.

A powerful attribute of systems 20 is that the control of DG network 400 can be achieved without the use of an independent control system connecting together the various DC power sources 30 in the network. Known power control systems typically require such separate control system, thereby precluding the "plug and play" operation obtained with systems 20. Thus, systems 20 make it relatively easy and inexpensive to develop a DG network 400. Also, by the use of system 20 the dispatch of energy from the DC power sources, e.g., flywheel 412, within DG network 400 is such that it tends to stabilize the short term voltage within the grid while allowing external commands to influence the relative real and reactive power supplied by each source.

Figure 16:
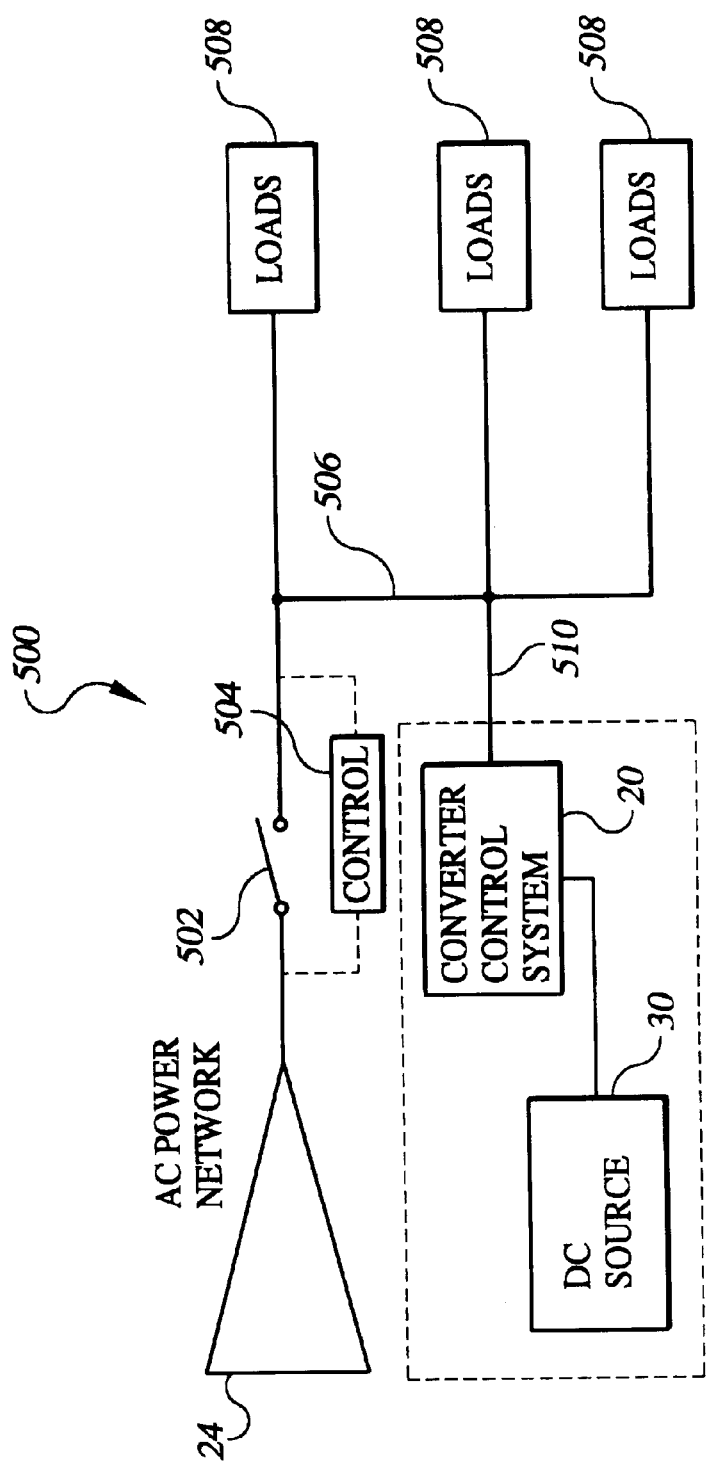
FIG. 16 is a schematic diagram of an uninterruptible power network including the power converter control system of the present invention.

Turning now to FIGS. 1 and 16, system 20 may be used advantageously in a uninterruptible power supply (UPS) 500. In UPS system 500, AC power network 24 is connected with switch 502, which is controlled by control 504, via distribution line 506 to a plurality of loads 508. These loads may include, for example, a residence, a factory, or a particular piece of equipment. UPS system 500 also includes one or more DC energy sources 30 connected via system 20 and distribution line 510 to loads 508. UPS system 500 is distinguishable from system 400 in that its DC energy source 30 is capable of generating and storing energy via energy sources other than fuel such as gas or coal. A flywheel or photovoltaic array are examples of suitable DC energy sources 30 for UPS system 500.

When switch 502 is closed, system 20 can address current faults and surges, along with transients and harmonics, in the manner discussed above using DC power from source 30, which the power converter 22 in system 20 converts to AC power before delivery to loads 508. When control 504 senses that the AC power from network 24 is falling out of predetermined tolerances, then it opens switch 502, and DC power source 30 can function as the sole source of power for loads 508. UPS system 500 accomplishes these functions without the need for separate control systems between control 504 and system 20, and between plural systems 20 when plural DC energy sources 30 are employed.

The basic configuration of the power systems shown in FIGS. 15 and 16 is the same with regard to switches 404 and 502. There is an AC power network 24, e.g., a utility, on one side and a source of load support on the other side of these switches. In this regard, these power systems are the same. In fact, system 20 makes it possible to provide both DG and UPS type functions in a single system.

In the preceding description of the invention power converter 22 has been described as connected to DC power source 30. The present invention also encompasses the use of AC power sources in place of DC power source 30, e.g., a microturbine.

In addition to the advantages and benefits of the control system of the present invention discussed above. Other benefits are provided by systems 20 and all variations thereof encompassed by the present invention, whether specifically described herein or not:

Individual power levels of each system 20 can be controlled. Selected current sources 62 and 64 can be commanded to a high level, which will export power to AC power network 24 for the system 20 connected to the current sources, or the current sources can be command to zero and the associated systems will operate in standby and support the voltage as needed. Any one DC power source 30 can be commanded to supply current to AC power network 24 while the others run in standby or possibly absorb the power into a storage unit.

The control provided by the present invention for transitioning DC power sources 30 from on grid to isolated operation, and vice versa, affords very good off-line uninterruptible power supply (UPS)-like operation.

Any of systems 20', 20", and 20''' (and any additional systems 20), including AC power network 24, can go off line. As an example, assume the entire system, e.g., system 20j or 20k, was operating with a stable balanced load equal to the power rating of about two power converters 22 and 1/R for each power converter is the inverse of 5% of the power converter's voltage rating divided by its current rating. Also assume each the amplitude of the current command signals for each power converter 22 is set to 25% of rating for the power converter and the AC voltage is at its nominal rated value so each power converter 22 is making about 12.5% of the load current and AC power network 24 is supplying the other 62.5% of the current. This would be the case if the AC power network output impedance is about 20% of rating of a single power converter or, in other words, is rated to supply about 5 times the power and has a 5% output impedance. If AC power network 24 then drops out (opens), systems 20', 20", and 20'" will sense the voltage drop and each will supply more current. They would jump to about 33% of the total load or 67% of their rating each. This increase in current would be associated with a drop in voltage of only about 67%–12.5%*5% or 2.725%. This correction would be very fast and the system voltage would recover in less than 1 mS.

The control scheme of the present invention takes care of the power transients so the switching between modes will be smooth. This smooth switching includes switching between various AC power sources connected in parallel including the utility grid.

The impedance current regulation of the present invention is an efficient method to deal with load current harmonics. The impedance current control is performed very quickly. The actual voltage from tee point 52 is compared to an ideal voltage wave from multiplier 70 and the voltage correction signal provided by voltage correction unit 112 is modified to push the voltage closer to the ideal voltage. This gives the present invention the capability to share harmonic loads between systems 20. Because of transformer and cable impedance, the system harmonic currents cause the largest voltage perturbations at their source. This means that the largest amount of correction will come from the system 20 nearest the harmonic source. Lesser amounts of correction will come from other nearby systems 20. This solution to harmonic problems provides for lower stress on distribution equipment and higher efficiency than a centralized harmonic correction source.

A network with dispersed systems 20 will have high power quality. This occurs because harmonics disturbance on the power system is corrected near their source. As a result, less equipment is affected by the disturbance and to a lesser extent.

With the right protective equipment, a network of systems 20 can be used to make very high reliability power systems. Systems 20 provide fast transitions and, when used with conventional protection equipment, isolate the power system from faults. Redundant power sources can be connected to the power network to increase system reliability.

Power system including systems 20 will tend to be more stable than a typical utility system since each system 20 presents a resistive impedance to AC power network which will tend to stabilize transients and absorb reactive energy. Any number of power converters 22 of different sizes can be connected in parallel and share all load currents without the need for high-speed communications between converters. All load currents include real, reactive, harmonic and transient currents. Through adjustment of real current command source 62 and reference current command source 64, output currents of the power converters 22 may be balanced for system optimization and integration of various types of energy sources with various response times. In this way each power converter 22 provides what current it can to support AC power network 24, but can be commanded up or down to change its relative share of the real power. In addition, system 20 is "plug and play." In other words, each power converter 22 inherently works with the other converters without having to know which other sources are connected at any point in time.

While the present invention has been described in connection with various embodiments, it will be understood that it is not limited to just these embodiments. On the contrary, it is intended to cover all alternatives, modifications, and equivalents as may be included within the spirit and scope of the invention as defined above and in the claims appended hereto.

What is claimed is:

1. A control system for a controlled current source that receives DC power as an energy input and provides an AC power output for delivery to an AC power network, the AC power output having an output voltage, the control system comprising:
   a. a voltage signal device, connectable to the controlled current source, for providing a voltage feedback signal representing voltage in the AC power output as an input to control the controlled current source; and
   b. an impedance current regulator for generating an impedance current signal as a function of characteristics of the AC power output from the controlled current source.

2. A control system according to claim 1, further including the controlled current source, said controlled current source connected to said voltage signal device to receive as an input said voltage feedback signal.

3. A control system according to claim 2, wherein said controlled current source is a power converter.

4. A control system according to claim 1, further including a filter for filtering the AC power output provided by the controlled current source before delivery to the AC power network.

5. A control system according to claim 4, wherein said voltage signal device is connected to said filter to receive the output voltage from the controlled current source.

6. A control system according to claim 4, wherein said filter is an LCL tee filter having a tee point.

7. A control system according to claim 6, wherein said voltage signal device is connected to said tee point to receive the output voltage from the controlled current source.

8. A control system according to claim 1, further including a phase locked loop, connected to said voltage signal device to receive as an input said voltage feedback signal, for providing a sine waveform and a cosine waveform as a function of phase of said voltage feedback signal.

9. A system according to claim 1, further including a first source that provides a reference AC voltage signal, said first source connected to said impedance current regulator, wherein said impedance current regulator generates said impedance current signal as a function of said reference AC voltage signal.

10. A system according to claim 9, wherein said impedance current regulator is connected to said voltage signal device and generates said impedance current signal as a function of said reference AC voltage signal and said voltage feedback signal.

11. A system according to claim 10, further including a difference unit connected to said first source and said voltage signal device for determining the voltage difference between said voltage feedback signal and said reference AC voltage signal and generating a voltage difference signal representing said voltage difference.

12. A system according to claim 11, further including a 1/R gain unit for multiplying said voltage difference signal by a gain of 1/R so as to develop said impedance current signal.

13. A system according to claim 12, the controlled current source having a rated output current and a rated output voltage, wherein R is a resistance that is 2–20% of the rated output voltage divided by the rated output current.

14. A system according to claim 13, wherein R is a resistance that is about 5% of the rated output voltage divided by the rated output current.

15. A system according to claim 1, further including a current signal device, connectable to the controlled current source, for providing a current feedback signal representing current in the AC power output as an input to control the controlled current source.

16. A system according to claim 15, further including a second source that provides a real current command signal and a third source that provides a reactive current command signal, wherein said impedance current regulator includes a difference unit for determining difference in current amplitude between said current feedback signal and a current summation of said real current command signal and said reactive current command signal.

17. A system according to claim 15, further including a summation unit, connected to receive said real current command signal and said reactive current command signal, that sums said signals so as to develop said current summation.

18. A system according to claim 1, further including a first RMS unit, connected to said voltage signal device, for providing a first RMS voltage signal that represents the root mean square of voltage in said voltage feedback signal, wherein said impedance current regulator uses said first RMS voltage signal in generating said impedance current signal.

19. A system according to claim 18, further including:
   a. a first source that provides a reference AC voltage signal;
   b. a second RMS unit, connected to said first source, for providing a second RMS voltage signal that represents the root mean square of voltage in said reference AC voltage signal; and
   c. a difference unit for providing an RMS difference signal representing the difference in voltage between said first RMS voltage signal and said second RMS voltage signal;
   d. wherein said impedance current regulator generates said impedance current signal as a function of said RMS difference signal.

20. A system according to claim 19, further including a gain unit connected to receive as an input a voltage signal generated by said impedance current regulator based on said RMS difference signal, wherein said gain unit multiplies said voltage signal by a 1/R gain so as to produce a current signal.

21. A system according to claim 1, wherein said impedance current regulator includes a selected frequency unit for increasing the current amplitude of said impedance current signal for currents at a selected frequency.

22. A system according to claim 21, wherein said selected frequency is the fundamental frequency for the AC power output for the controlled current source.

23. A system according to claim 10, further including a voltage correction unit that provides a voltage command signal to the controlled current source as a function of said impedance current signal.

24. A system according to claim 23, wherein only said voltage command signal, and not said voltage feedback signal, is provided directly to said controlled current source.

25. A system according to claim 23, wherein said voltage correction unit generates a voltage correction signal as a function of said impedance current signal, said voltage correction unit including a summing unit for summing said reference AC voltage signal and said voltage correction signal so as to generate said voltage command signal.

26. A system according to claim 25, further including an RMS unit for taking the root mean square of said reference AC voltage signal and generating an RMS voltage signal representing said root mean square, wherein said root mean square voltage is provided to said summing unit where it is summed with said reference AC voltage so as to generate said voltage command signal.

27. A system according to claim 1, further including;
   a. a voltage correction unit, connected to receive said impedance current signal, that generates a voltage correction signal for controlling the controlled current source using said impedance current signal;
   b. a current signal device, connected to said voltage correction unit, for providing a current feedback signal representing current in the AC power output; and
   c. wherein said voltage correction unit generates said voltage correction signal also using said current feedback signal.

28. A system according to claim 27, further including:
   a. a second source that provides a real current command signal;
   b. a third source that provides a reactive current command signal;
   c. a summing unit for summing said impedance current signal, said real current command signal and said reactive current command signal so as to generate a resultant current signal;
   d. wherein said voltage correction unit further includes:
      i. a current limit for limiting said resultant current signal;
      ii. a difference unit for determining the current difference between said current feedback signal and said resultant current signal and providing a difference current signal representing said current difference;
      iii. a gain unit for multiplying said difference current signal by a gain P so as to generate said voltage correction signal.

29. A system according to claim 1, further including:
   a. a second source that provides a real current command signal;
   b. a third source that provides a reactive current command signal; and
   c. a summing unit for summing said impedance current signal, said real current command signal and said reactive current command signal so as to generate a resultant current signal.

30. A system according the claim 29, further including:
   a. a phase locked loop, connected to said voltage signal device to receive as an input said voltage feedback signal, for providing a sine waveform and a cosine waveform as a function of phase of said voltage feedback signal;
   b. a first multiplier for multiplying said sine waveform by said real current command signal;
   c. a second multiplier for multiplying said cosine waveform by said reactive current command signal.

31. A system for providing AC power to an AC power network, the system intended for use with a first source that provides a reference AC voltage signal, a second source that provides a real current command signal and a third source that provides a reactive current command signal, the system comprising:

a. a controlled current source including:
  i. a source of DC power;
  ii. a converter for converting said DC power to AC power having an output voltage;
b. a current command unit for generating a resultant current command signal, wherein said current command unit is connected to said controlled current source and is connectable to said first and second sources, said current command unit including:
  i. an impedance current regulator that provides an impedance current signal; and
  ii. a summing unit for adding said impedance current to the real current command signal from the second source and the reactive current command signal from the third source so as to create said resultant current command signal.

32. A system according to claim 31, further including a voltage signal device for providing a voltage output signal representing output voltage from said converter, wherein said impedance current regulator is connected to the first source and said device, further wherein said impedance current regulator generates said impedance current signal as a function of the reference AC voltage signal from the first source and said output voltage signal from said voltage signal device.

33. A system according to claim 31, wherein said current command unit is connected so that said resultant current command signal is provided as an input to said converter.

34. A system according to claim 31, wherein said controlled current source includes a voltage correction unit, connected to said current command unit to receive said resultant current command signal, that provides a voltage input signal to said converter for controlling said output voltage and reactive current in said AC power output, wherein said voltage input signal is determined as a function of said resultant current command signal.

35. A system according to claim 34, wherein said voltage correction unit is connected to (a) said converter to receive a voltage feedback signal representing AC power provided by said converter and (b) the first source to receive the reference AC voltage signal, said voltage input being further determined as a function of said voltage feedback signal and the reference AC voltage signal.

36. An impedance current regulator for use in a power converter control system including a power converter providing an AC power output, a first source for a reference AC voltage signal, a second source for a real current command signal, a third source for a reactive current command signal, and a voltage signal device for generating a feedback voltage signal representing voltage of the AC power output from the power converter, the impedance current regulator comprising;
  a. a difference unit, connected to the device and to the first source, for determining a voltage difference between the reference AC voltage signal and a feedback voltage signal and generating a voltage difference signal representing said voltage difference;
  b. a gain unit connected to said difference unit for multiplying said voltage difference signal by a first gain so as to generate an impedance current signal; and
  c. a summing unit, connected to said gain unit, the second source, the third source and the controlled current source, that combines said impedance current signal with the real current command signal and the reactive current command signal to produce a resultant current signal usable for controlling the power converter.

37. A regulator according to claim 36, the power converter having a rated output current and a rated output voltage, wherein said first gain is 1/R, where R is a resistance that is 2–20% of the rated output voltage divided by the rated output current.

38. A regulator according to claim 36, the power converter having a rated output current and a rated output voltage, wherein said first gain is 1/R, where R is a resistance that is about 5% of the rated output voltage divided by the rated output current.

39. An AC power system comprising:
  a. a power converter for converting a DC power input to an AC power output having an output voltage, said power converter having a rated output voltage and a rated output current;
  b. a first source for providing a reference AC voltage signal;
  c. a second source for providing a real current command signal;
  d. a third source for providing a reactive current command signal;
  e. an impedance current regulator including:
    i. a difference unit, connectable to said power converter and said first source, for determining the voltage difference between said output voltage from the power converter and said reference AC voltage and providing a voltage difference signal representing said voltage difference;
    ii. a gain unit, connected to the difference unit, for multiplying said voltage difference signal by a gain 1/R, where R is 2–20% of the rated output voltage divided by the rated output current, so as to generate an impedance current signal;
    iii. a summing unit, connected to said gain unit and connectable to said second source and said third source, for adding said impedance current signal to said real current command signal and said reactive current command signal to produce a resultant current command signal; and
  f. a voltage correction unit, connected to said summing unit and connectable to said power converter, for multiplying said resultant current command signal by a gain P to generate a correction voltage signal that is provided to said power converter.

40. A method of controlling the operation of a power converter connected to an AC power network that provides an AC power output, the method comprising the steps of:
  a. providing a reference AC voltage signal representing output voltage from the power converter;
  b. generating an impedance current command signal, wherein said impedance current command signal is generated based on said reference AC voltage signal; and
  c. generating a voltage command signal for controlling the operation of the power converter based on said impedance current command signal and providing said voltage command signal to the power converter.

41. A method according to claim 40, further including the steps of:
  a. providing a real current command signal;
  b. providing a reactive current command signal;
  c. combining said real current command signal, said reactive current command signal and said impedance current signal to as to generate a resultant current command signal; and
  d. generating said voltage command signal based on said resultant current command signal.

42. A method of controlling the supply of AC power to at least one load comprising the steps of:
  a. connecting in parallel a plurality of power converters, each for converting DC input power from a corresponding respective DC power source into an AC output power having an output voltage;
b. relative to each of said plurality of power converters, performing the steps of:
i. providing a reference AC voltage signal representing output voltage from the power converter;
ii. generating an impedance current command signal, wherein said impedance current command signal is generated based on said reference AC voltage signal; and
iii. generating a voltage command signal for controlling the operation of the power converter based on said impedance current command signal and providing said voltage command signal to the power converter;
iv. providing said AC output power from at least one of the power converters to said at least one load.

43. A method according to claim 42, wherein said steps b(i–iii) are performed individually with respect to each of the plurality of power converters without the use of control information regarding the operation of others of said plurality of power converters.

44. A distributed generation network, comprising:
a. an AC power network for providing AC power;
b. a DC power source for providing DC power;
c. a power converter for converting said DC power into AC power, said power converter connected to said AC power network and said DC power source; and
d. a control system connected to said power converter for providing a voltage command signal that controls the operation of said power converter, wherein said control system generates (i) a voltage feedback signal representing voltage in said AC power provided by said DC power source and (ii) an impedance current signal as a function of AC power provided by said DC power source, further wherein said control system generates said voltage command signal based on said voltage feedback signal and said impedance current signal.

45. A network according to claim 44, wherein said control system additionally generates a current feedback signal representing current in said AC power provided by said DC power source, said voltage command signal being generated by said control system based on said current feedback signal.

46. A network according to claim 44, further including:
a. a first source for providing a reference AC voltage signal;
b. a second source for providing a real current command signal;
c. a third source for providing a reactive current command signal; and
d. wherein said control system generates said voltage command signal as a function of said reference AC voltage signal, said real current command signal and said reactive current command signal.

47. A network according to claim 44, further including:
a. a plurality of said DC power sources for providing DC power;
b. a plurality of said power converters for converting DC power to AC power, each of said power converters connected to a corresponding respective one of said plurality of DC power sources, wherein said power converters are connected in parallel; and
c. a plurality of said control systems, each for controlling a corresponding respective one of said power converters.

48. An uninterruptible power supply, comprising:
a. an AC power network for providing AC power;
b. a DC power source for providing DC power, wherein said DC power source does not directly use fuel in developing said DC power;
c. a power converter for converting said DC power into AC power, said power converter connected to said AC power network and said DC power source; and
d. a control system connected to said power converter for providing a voltage command signal that controls the operation of said power converter, wherein said control system generates (i) a voltage feedback signal representing voltage in said AC power provided by said DC power source and (ii) an impedance current signal as a function of AC power provided by said DC power source, further wherein said control system generates said voltage command signal based on said voltage feedback signal and said impedance current signal.

49. An uninterruptible power supply according to claim 48, wherein a load is connected to said uninterruptible power supply, said uninterruptible power supply further including a switch for selectively connecting said AC power network with the load and a controller for controlling operation of said switch.

50. An AC power system connectable to an AC power network, the system comprising:
a. a plurality of DC power sources for providing DC power;
b. a plurality of power converters for converting DC power into AC power, each of said plurality of power converters connected to an associated one of said plurality of DC power sources, further wherein said power converters are connected in parallel;
c. a plurality of control systems, each connected to an associated one of said plurality of power converters, for providing a voltage command signal that controls the operation of said associated power converter, wherein said each control system generates (i) a voltage feedback signal representing voltage in said AC power provided by said DC power source connected to said associated one of said power converters and (ii) an impedance current signal as a function of AC power provided by said DC power source connected to said associated one of said power converters, further wherein said each control system generates said voltage command signal based on said voltage feedback signal and said impedance current signal.

51. A control system for a three-phase power converter for converting DC power into three-phase AC power, the converter having at least first and second output nodes for said AC power, said control system comprising:
a. a first control system including:
i. a voltage signal device, connectable to the power converter, for providing a voltage feedback signal representing voltage in the AC power output from the first output node as a first input to control the power converter; and
ii. an impedance current regulator for generating an impedance current signal as a function of characteristics of the AC power output from the first output node of the power converter; and
b. a second control system including:
i. a voltage signal device, connectable to the power converter, for providing a voltage feedback signal representing voltage in the AC power output from the second output node as a second input to control the power converter; and
ii. an impedance current regulator for generating an impedance current signal as a function of characteristics of the AC power output from the second output node of the power converter.

* * * * *

UNITED STATES PATENT AND TRADEMARK OFFICE
CERTIFICATE OF CORRECTION

PATENT NO. : 6,693,409 B2
DATED : February 17, 2004
INVENTOR(S) : Lynch et al.

It is certified that error appears in the above-identified patent and that said Letters Patent is hereby corrected as shown below:

Title page,
Item [60], Related U.S. Application Data, should read as follows:
-- Provisional application No. 60/307,568, filed on Jul. 23, 2001. --

Signed and Sealed this

Twenty-first Day of December, 2004

JON W. DUDAS
*Director of the United States Patent and Trademark Office*